United States Patent
Miyasaka

(10) Patent No.: US 8,189,941 B2
(45) Date of Patent: *May 29, 2012

(54) IMAGE PROCESSING DEVICE, DISPLAY DEVICE, IMAGE PROCESSING METHOD, AND PROGRAM

(75) Inventor: Daigo Miyasaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1036 days.

This patent is subject to a terminal disclaimer.

(21) Appl. No.: 12/095,279

(22) PCT Filed: Nov. 24, 2006

(86) PCT No.: PCT/JP2006/323426
§ 371 (c)(1),
(2), (4) Date: May 28, 2008

(87) PCT Pub. No.: WO2007/063771
PCT Pub. Date: Jun. 7, 2007

(65) Prior Publication Data
US 2009/0040246 A1 Feb. 12, 2009

(30) Foreign Application Priority Data
Nov. 30, 2005 (JP) ................................. 2005-346347

(51) Int. Cl.
*G06K 9/40* (2006.01)
(52) U.S. Cl. ........................................ 382/255; 345/698
(58) Field of Classification Search ........................ None
See application file for complete search history.

(56) References Cited

U.S. PATENT DOCUMENTS

| 6,915,319 | B1 | 7/2005 | Sato | |
|---|---|---|---|---|
| 7,330,199 | B2 * | 2/2008 | Someya et al. | 345/698 |
| 2002/0191008 | A1 * | 12/2002 | Naka et al. | 345/690 |
| 2005/0147317 | A1 * | 7/2005 | Daly et al. | 382/264 |
| 2006/0038826 | A1 * | 2/2006 | Daly | 345/598 |
| 2006/0233456 | A1 * | 10/2006 | Ahn et al. | 382/275 |
| 2006/0269159 | A1 * | 11/2006 | Kim et al. | 382/256 |

FOREIGN PATENT DOCUMENTS

| JP | 63-015576 A | 1/1988 |
|---|---|---|
| JP | 04-165874 A | 6/1992 |
| JP | 07-288768 A | 10/1995 |
| JP | 2001-148007 A | 5/2001 |
| JP | 2001-169112 A | 6/2001 |
| JP | 2002-082658 A | 3/2002 |
| JP | 2002-112038 A | 4/2002 |
| JP | 2003-30440 A | 10/2003 |
| JP | 2003-333348 A | 11/2003 |
| JP | 2004-054210 A | 2/2004 |
| JP | 2004-289671 A | 10/2004 |
| WO | 01-28092 A1 | 4/2001 |

* cited by examiner

*Primary Examiner* — Jason M Repko
*Assistant Examiner* — Siamak Harandi
(74) *Attorney, Agent, or Firm* — Sughrue Mion, PLLC

(57) ABSTRACT

An image processing device includes a detector for detecting a linear-interpolation-applicable area and an expansion corrector for performing a gradation expanding process on the linear-interpolation-applicable area detected by the detector. When a detector 11 detects a linear-interpolation-applicable area, if the gradation values of pixels preceding and following a pixel where a gradation change in a predetermined range is detected are the same as each other, then the detector judges the gradation change as being caused by a noise or the like, and regards the gradation value of the pixel where the gradation change is detected as the gradation values of pixels preceding and following the pixel.

18 Claims, 16 Drawing Sheets

[Fig.10]
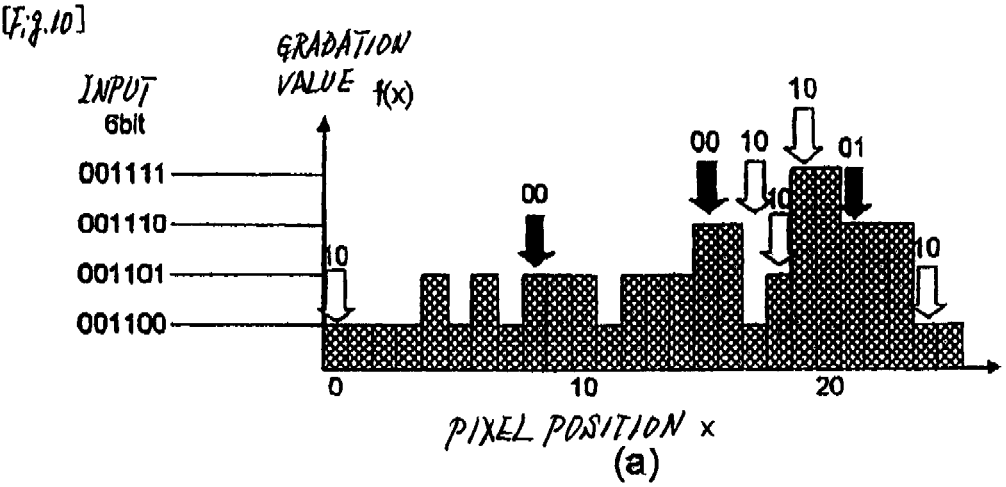
(a)
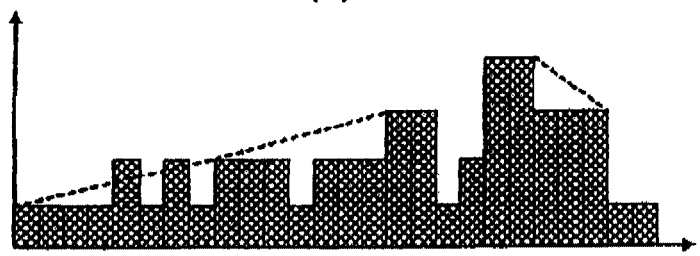
(b)
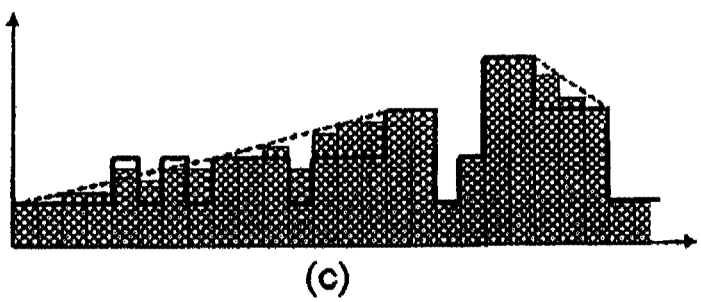
(c)

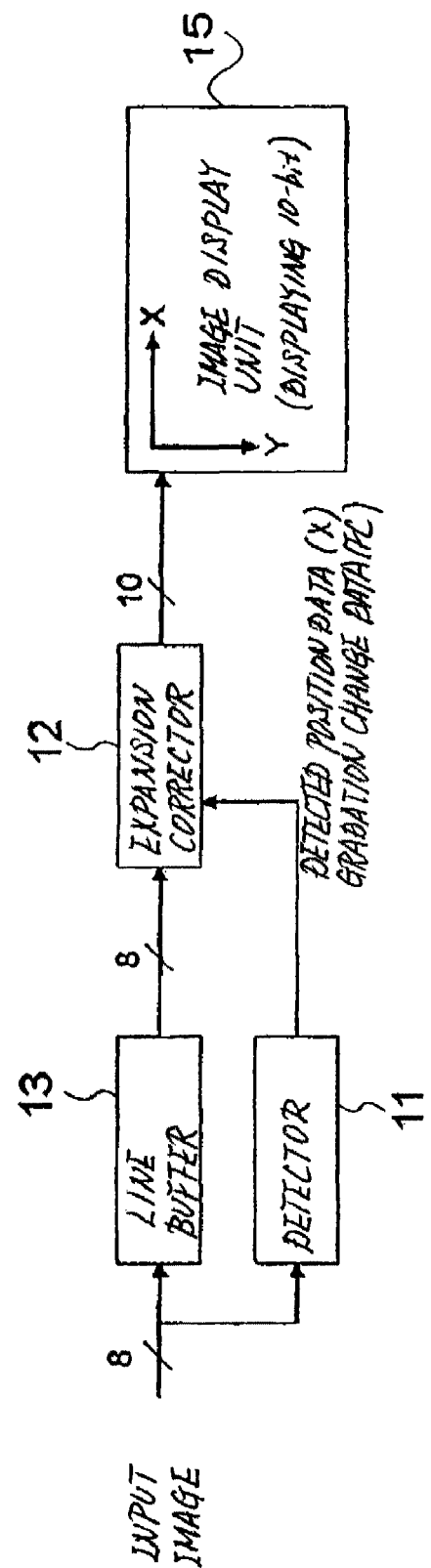
[Fig. 12]

[Fig.13]
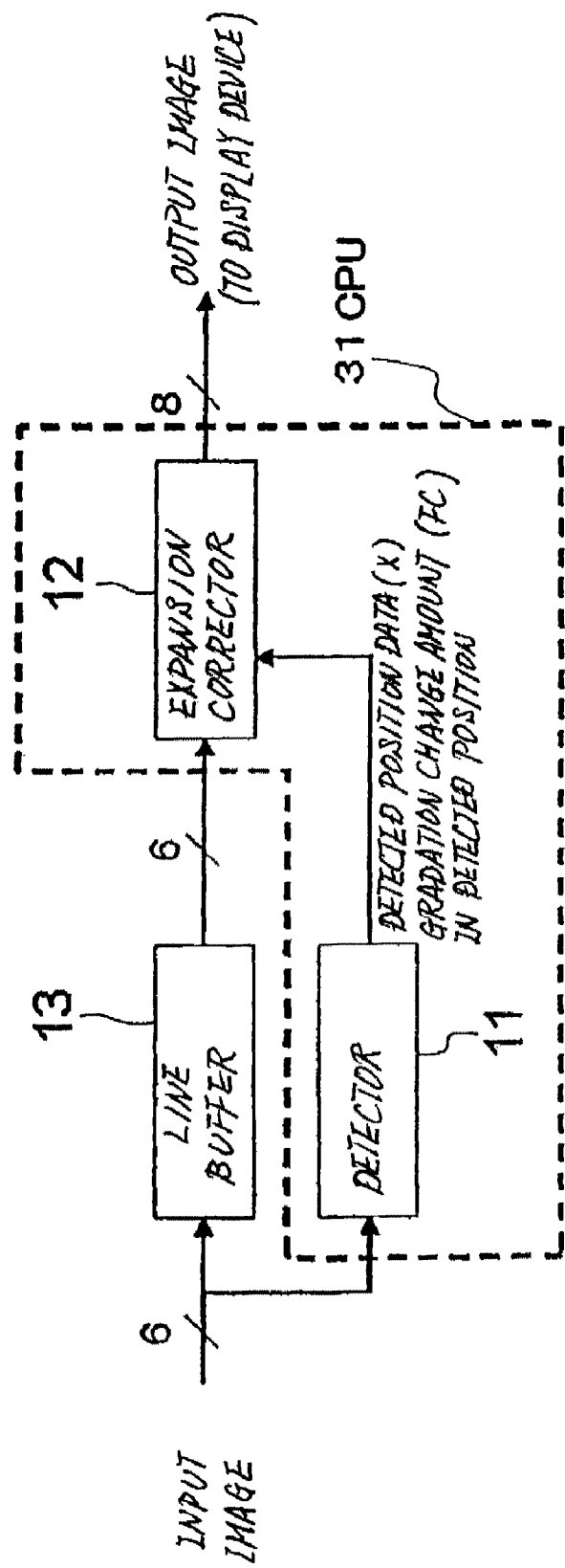

[Fig.14]
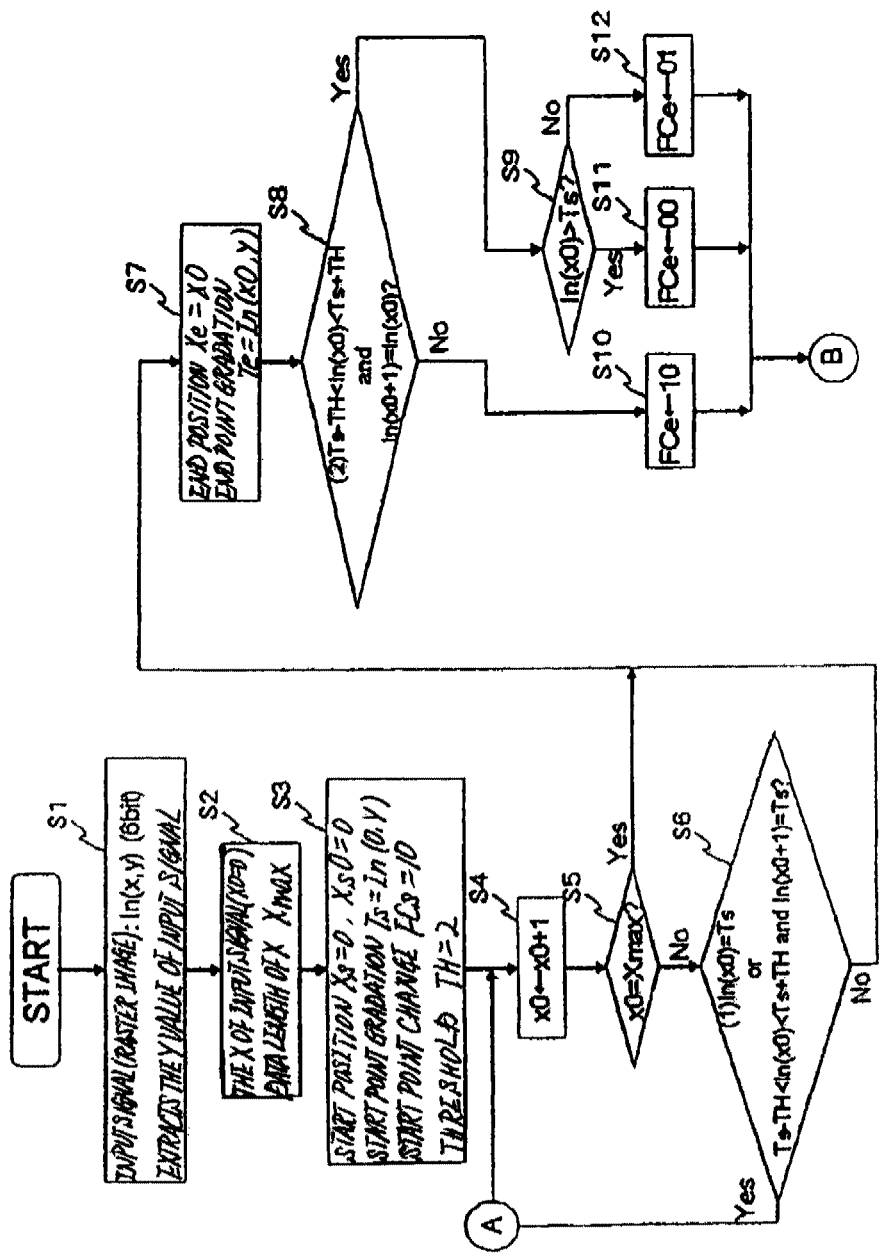

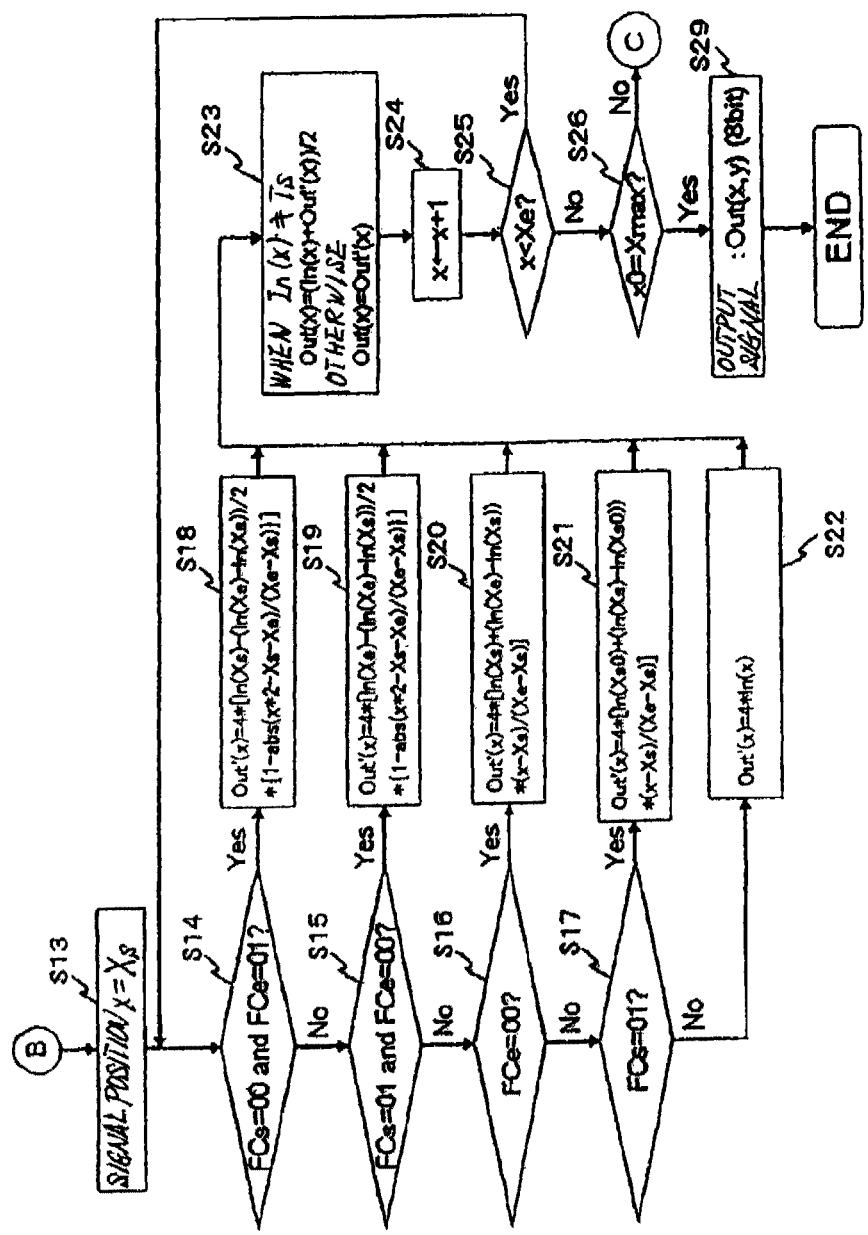
[Fig.15]

[Fig.16]
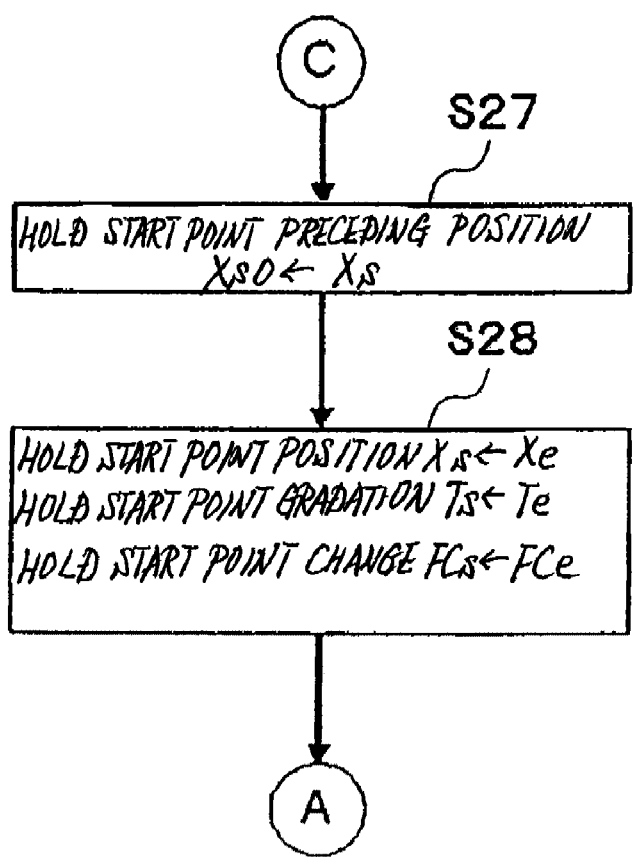

IMAGE PROCESSING DEVICE, DISPLAY DEVICE, IMAGE PROCESSING METHOD, AND PROGRAM

TECHNICAL FIELD

The present invention relates to an image processing device, a display device, an image processing method, and a program for performing a gradation expanding process on an image signal.

BACKGROUND ART

In recent years, efforts have been made to increase the resolution and employ more gradations for display devices typified by thin displays for providing the users with video images that are better in image equality and more realistic. The image signal that is supplied to the display devices has become digital in nature. Generally, 6-bit to 8-bit data per pixel are assigned to each of color components including R (red), G (green), and B (blue).

If the number of bits that can be displayed on a display device and the number of bits of an image signal are the same as each other, then the display device basically uses an input signal as it is to display an image. However, the number of bits that can be displayed on a display device and the number of bits of an image signal are often different from each other. If the number of bits of an image signal is greater than the number of bits that can be displayed on a display device, then the display device reduces the number of bits of the image signal according to a process of rounding off low-order bits of the image signal, a dither process, an FRC (frame rate control) process, or the like.

Conversely, if the number of bits of an image signal is smaller than the number of bits that can be displayed on a display device, then low-order bits are added to increase the number of bits of the image signal (gradation expanding process). The gradation expanding process is also employed when the data of the image signal are processed in the display device depending on the characteristics of the display device. Furthermore, the gradation expanding process is carried out in order to increase the processing accuracy even if the number of bits of the image signal and the number of bits that can be displayed on the display device are the same as each other. In this case, after the gradation expanding process is carried out, the number of bits of the image signal is converted into the number of bits that can be displayed on the display device according to the dither process, the FRC process, or the like.

The gradation expanding process is also employed for other purposes than converting the number of bits of the digital signal and increasing the processing accuracy. For example, if the number of bits of the digital signal is small, then false contours appearing as contour lines (gradations which should vary continuously in a plane are not perceived as smoothly varying, but are recognized as contour lines) become apparent in an area containing smoothly varying gradations. The gradation expanding process is employed as a technique for preventing such false contours.

Generally, the gradation expanding process is classified into two types, i.e., (1) a process of performing the same processing on all image signals, and (2) a process of extracting an image signal of a particular image and processing only necessary pixels.

(1) The process of performing the same processing on all image signals may be a first process of adding dither noise or random noise. This process is capable of slightly reducing false contours though it has a problem in that the added noise component is noticeable.

There is a second process of adding the values of high-order bits as low-order bits. For example, in order to convert a 6-bit input signal "101101" into an 8-bit input signal, the values of two high-order bits of the input signal are added as two low-order bits to convert the input signal into "10110110". There is also a third process of simply adding 0 or 1 as a low-order bit. Though these second and third processes are simple, they cannot reduce false contours because the gradation difference is not reduced in a gradation-varying area.

(2) The process of extracting an image signal of a particular image and processing only necessary pixels may be a first process of performing low-pass filter (LPF) processing on a false-contour area, as disclosed in Japanese Patent Laid-Open No. 63-15576 (hereinafter referred to as Patent Document 1). According to this background art, in order to reduce false contours that are produced by performing gamma correction (image processing) on a digital image signal, an area where false contours are produced is adaptively judged, and an integrated value of image signals of nearby pixels in the area is output (synonymous with LPF processing). The LPF processing reduces the gradation difference in the area where false contours are produced.

However, if the intervals at which the false contours are produced (in other words, contour line intervals) are greater than the filter size (the integrated range of nearby pixels), the above process allows the viewer to easily distinguish between a filtered region and an unfiltered region in an area containing smoothly varying gradations, and hence does not lead to an appreciably improved image quality even though the false contours are reduced.

According to a second process disclosed in Japanese Patent Laid-Open No. 4-165874 (hereinafter referred to as Patent Document 2), in order to reduce false contours that are produced by performing gamma correction (image processing), when an area containing smoothly varying gradations (smooth gradation area) is determined, the gradation values of pixels between contour lines of the false contours in the area are found by linearly interpolating the gradation values of pixels on contour lines. This process goes not suffer from the problems of the first process because uniform gradation changes are achieved in the smooth gradation area.

It follows from the foregoing that the gradation expanding process for detecting particular information of pixels and performing linear interpolation depending on the detected result is considered to be preferable from the standpoint of the reduction of false contours. The process using linear interpolation is also disclosed in Japanese Patent Laid-Open No. 2000-304400 (hereinafter referred to as Patent Document 3), Japanese Patent Laid-Open No. 2003-333348 (hereinafter referred to as Patent Document 4), and Japanese Patent Laid-Open No. 2004-54210 (hereinafter referred to as Patent Document 5).

According to Patent Documents 3 through 5, unlike Patent Document 1 and Patent Document 2, the gradation expanding process is carried out in order to solve the problem of false contours that are produced because the bit depth of a digital image signal is small or in order to maximize the gradation capability of a display device. However, the process of linear interpolation is the same as with Patent Document 1 and Patent Document 2.

Patent Document 3 discloses an image processing device comprising a false contour detector and a pixel value converter. The false contour detector detects a false contour on the conditions that after the same luminance level continues horizontally over two pixels or more, the luminance level increases by 1 (condition 1), and after the luminance level decreases by 1, the same luminance level continues horizontally over two pixels or more (condition 2). The pixel value converter performs linear interpolation on the detected false contour.

Patent Document 4 discloses a color signal expanding device comprising a data distribution detector and a data depth expander. The data distribution detector extracts (detects) an area where colors vary gradually from the distribution of gradation data. Specifically, the data distribution detector detects an area where, in a pixel group K of the same gradation, the number of pixels is equal to or greater than a lower limit threshold P and equal to or smaller than an upper limit threshold Q and the gradation difference with the pixels of an adjacent pixel group is equal to or smaller than a decision threshold S. Then, the data distribution detector performs linear interpolation on the area where colors vary gradually to determine a gradation value to be added to the area. The data depth expander adds the gradation value to an expanded area and generates expanded image data representing an expanded data depth of the color signal.

Patent Document 5 discloses an image processing device comprising a detecting means and a signal expanding means. The detecting means determines whether there is a pseudo—(false) contour or not by determining whether or not the difference between a first position where the same pixel data continues and a first position where next pixel data continues is equal to a width over which the same data continues, and also determining whether the gradation value of an area where the same pixel data continues is greater or smaller by 1 than the gradation value of an area where the next pixel data continues. In order to obtain a smoothly continuous image in the area where the pseudo-contour is produced, the signal expanding means expands the gradation of the image data smoothly and linearly (by performing linear interpolation).

The arrangements disclosed in Patent Documents 3 through 5 pose no problem in that the gradation expanding process is performed according to the linear interpolation disclosed in Patent Document 2. However, they are problematic in that they are susceptible to noise components, are unable to detect an area appropriately, and fail to perform the gradation expanding process as desired because of the conditions used when detecting a linear-interpolation-applicable area for performing the gradation expanding process by way of linear interpolation, i.e., the conditions that an area where the same gradation continues should be positioned adjacent to the linear-interpolation-applicable area and the gradation difference in the area is equal to or smaller than a constant value.

DISCLOSURE OF THE INVENTION

It is an object of the present invention to provide an image processing device, a display device, an image processing method, and a program which are less susceptible to noise components in an image area of gradually varying gradations and which are capable of appropriately detecting a smooth gradation area and performing a desired gradation expanding process.

To achieve the above object, in accordance with the present invention, when a detector detects a linear-interpolation-applicable area, if the gradation values of pixels preceding and following a pixel where a gradation change in a predetermined range is detected are the same as each other, then the detector judges the gradation change as being caused by a noise or the like, and regards the gradation value of the pixel where the gradation change is detected as the gradation values of pixels preceding and following the pixel.

Since a false contour area of an image which contains a lot of noise/error components that have heretofore been difficult to detect can appropriately be detected, it is possible to perform a more desirable gradation expanding process for high image quality. When the gradation expanding process is performed on an area containing a noise/error component, the noise component can be reduced for displaying a high-quality image.

Accordingly, the present invention is less susceptible to noise components and is capable of appropriately detecting a smooth gradation area and performing the gradation expanding process appropriately.

BRIEF DESCRIPTION OF THE DRAWINGS

FIG. 10 is a diagram showing a processing operation of the expansion corrector of the image processing device shown in FIG. 6.

FIG. 12 is a block diagram showing an arrangement of a display device according to the present invention.

FIG. 13 is a block diagram showing an arrangement of an information processing device for carrying out an image processing method according to the present invention.

FIG. 14 is a flowchart of a sequence of the image processing method according to the present invention.

FIG. 15 is a flowchart of a sequence of the image processing method according to the present invention.

FIG. 16 is a flowchart of a sequence of the image processing method according to the present invention.

BEST MODE FOR CARRYING OUT THE INVENTION

Figure 1:
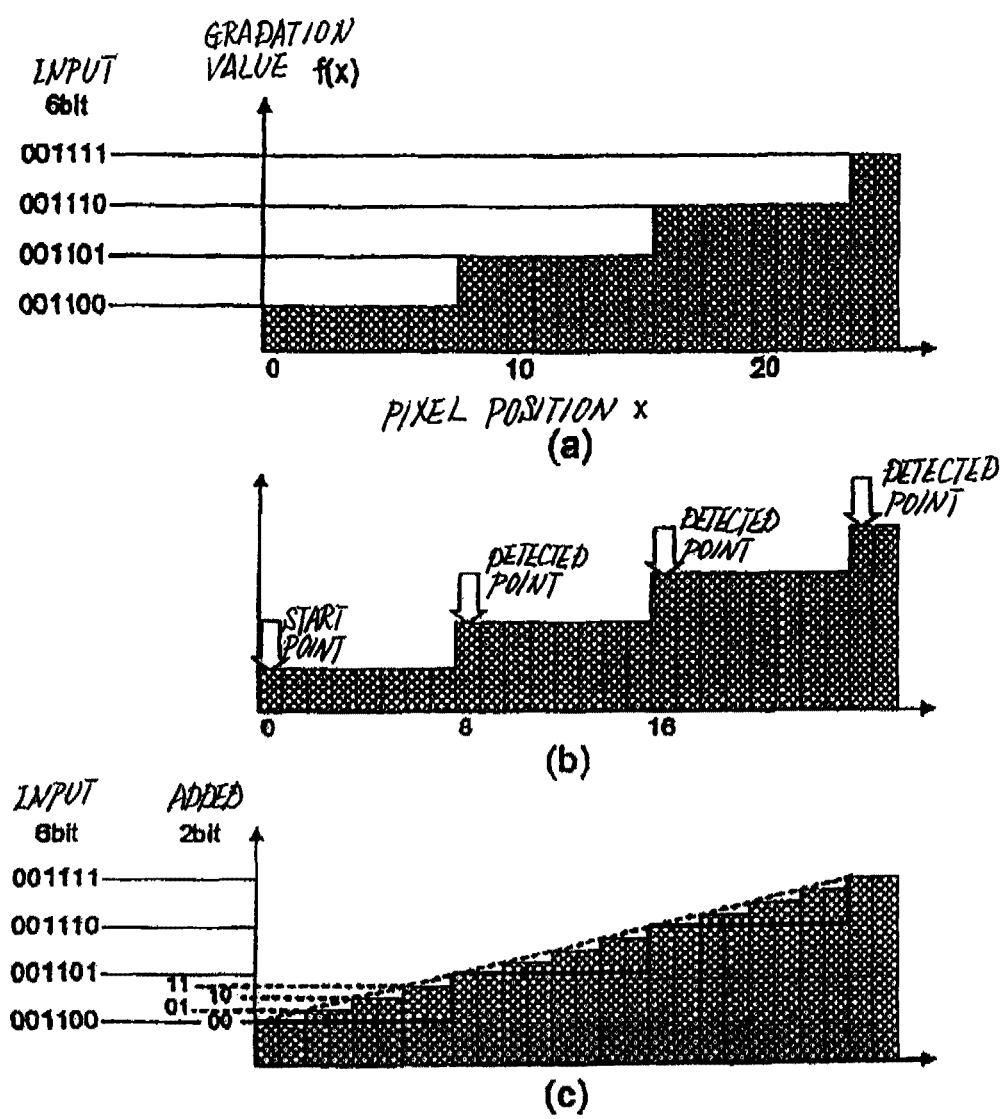
FIG. 1 is a diagram showing an example of a detecting process and a linear interpolation process according to the background art in a gradation expanding process.

Prior to describing the present invention, the principles of the present invention will first be described below.

Principles of the Invention

According to the gradation expanding process of the background art, the process of detecting an area where false contours are produced or an area where the gradation expanding process is to be performed by way of linear interpolation to make gradation changes smooth (hereinafter referred to as "linear-interpolation-applicable area") employs conditions that areas containing successive pixels of the same gradation value are adjacent to each other and the difference between the gradation values in the areas falls in a constant range. The detecting process is capable of detecting the linear-interpolation-applicable area without problems if the gradation in an area to be detected increases or decreases monotonously, such as a smooth gradation area that is artificially generated by CG (computer graphics), for example. However, when an image signal containing added noise such as dither noise or high-frequency noise such as JPEG is input, the detecting process is susceptible to the noise component and the gradation expanding process outputs totally different results. Such a problem of the background art will be described in specific detail below with reference to FIGS. 1 and 2.

FIG. 1(a) shows an example of a 6-bit image signal to be processed which is free of a noise component. FIG. 1(b) shows a linear-interpolation-applicable area detected by the gradation expanding process of the background art. FIG. 1(c) shows an 8-bit image signal generated by the gradation expanding process (which generates 2 bits to be added). The horizontal axis of FIG. 1(a)-(c) represents position x and the vertical axis thereof represents gradation value f(x), with the gradation value of each pixel being indicated by a rectangle.

In FIG. 1(a), the 6-bit image signal to be processed has gradation values f(0) through f(7) represented by (001100) bin ((XXXXXX) bin indicates a binary notation), gradation values f(8) through f(15) represented by (001101)bin, gradation values f(16) through f(23) represented by (001110)bin, and gradation values f(24), f(25) represented by (001111)bin.

Since gradation value f(x) varies smoothly as pixel position x varies, the pixel sequence is considered to express a smooth gradation area. In this smooth gradation image, it is desirable that the gradation vary more smoothly.

For converting the 6-bit image signal shown in FIG. 1(a) into an 8-bit image signal, contours and a linear-interpolation-applicable area are detected at first.

In a process of detecting contours and linear-interpolation-applicable area, x=0 is held as the value of start point Xs, and gradation value f(0)=(001100)bin of the start point is held as start point gradation value Ts. Then, smallest position x which is greater than Xs and where f(x)≠Ts is detected. Since f(8)=(001101) bin≠Ts and Xs<8, x=8 is set as a detected point. As the gradation difference between f(8) and f(0) is 1 (minimum gradation difference), the area lying in between is considered to be a linear-interpolation-applicable area. Then, the same process as described above is carried out with the detected point being used as a start point and the gradation value of the detected point as a start point gradation value. The result of the process is shown in FIG. 1(b). In this example, x=0, x=8, 16, 24 are obtained as detected points. In as much as the gradation differences at all the detected points are 1 and the same gradation value continues between detected points, the pixel sequence from at least x=0 to x=24 is considered to be a linear-interpolation-applicable area.

Based on the above detected results, the gradation expanding process is performed on the image signal to expand it by 2 bits.

In the gradation expanding process, the pixel sequence (the pixel sequence from x=0 to x=24) which is regarded as the linear-interpolation-applicable area in FIG. 1b is interpolated.

In the interpolation process, the gradation values of the detected points are interconnected by a straight line (the slanted dotted line in FIG. 1(c)). Then, a value of 2 bits to be added to the gradation values, which is a value closest to the straight line, is determined. For example, in the area from x=0 to x=8, if the start point of the straight line is start position Xs and the end point of the straight line is end point Xe, then the value of 2 bits to be added is determined by the equation (added value)=(x−Xs)/(Xe−Xs)*4=(x−0)/(8−0)*4 (decimals truncated). In the equation, "*" means multiplication.

"4" is determined by multiplying 2 by (the number of bits to be added). According to the above equation, the value to be added is (00) bin for x=0, 1, (01) bin for x=2, 3, (10) bin for x=4, 5, and (11) bin for x=6, 7. The value is added as low-order bits to the 6-bit image data (gradation value) to obtain expanded 8-bit corrected data. (00) bin is added to the pixel data for x=25 which are not included in the linear-interpolation-applicable area.

It can be seen from the detected result shown in FIG. 1(c) that when the pixel data are expanded into 8-bit data, the gradation difference between detected points varies in four steps, so that the gradation varies smoothly.

FIG. 2(a) shows an example in which an image signal contains a noise component. The image signal shown in FIG. 2(a) is different from the image signal shown in FIG. 1(a) in that the gradation value for x=3 changes from (001100) bin to (001101) bin and the gradation value for x=19 changes from (00110) bin to (001101) bin. These two gradation values represent a noise component. Such gradation value changes affect the detection of a linear-interpolation-applicable area.

FIG. 2(b) shows contours and a linear-interpolation-applicable area that are detected.

As with the detected result for the image signal shown in FIG. 1(b), x=0 is held as the value of start point Xs, and gradation value f(0)=(001100) bin of the start point is held as start point gradation value Ts. In this example, the condition f(x)≠Ts is first detected at position x=3. Then, the same process as described above is carried out with the detected point being used as a start point and the gradation value of the detected point as a start point gradation value. The result of the process is shown in FIG. 2(b). In this example, x=0, x=3, 4, 8, 16, 19, 20, 24 are obtained as detected points.

Based on the above detected results, a linear-interpolation-applicable area is determined. Three conditions for determining a linear-interpolation-applicable area will be described below, i.e., (1) the same gradation value as for the start point position continues over a plurality of pixels and the same gradation value as for the end point position continues over a plurality of pixels, (2) the gradation change at the start point position is decremental and is to be smoothed, or the gradation change at the end point position is incremental and is to be smoothed, or specifically, the difference between the gradation value at the start point position and the gradation value at the end point position is a minimum gradation difference (e.g., the gradation difference is 1), and (3) when the start point position is other than x=0, both the gradation change at the start point position and the gradation change at the end point position are incremental or decremental. Though some variations of the detecting conditions are conceivable, all of them have the same purpose of determining an area to be linearly interpolated for smoothly changing the gradation.

The above condition (1) is a condition meaning that there is no need to smooth gradation changes in an area where the gradation varies per pixel. The above condition (2) is a condition for determining whether a contour is an ordinary contour or a false contour whose gradation change is to be smoothed. The above condition (3) is a condition for determining an area where the interpolation process is to be carried out for simply increasing or decreasing the gradation in the area. The gradation data from pixel position x=0 to pixel position x=24 shown in FIG. 1 satisfies the above conditions (1) through (3).

As shown in FIG. 2(b), the pixel data are successively determined from x=0 based on the above conditions.

With respect to Xs=0, Xe=3, since the condition (1) is not satisfied (the same gradation value as the gradation value for Xe=3 does not continue over a plurality of pixels) at these positions, the area is not judged as a linear-interpolation-applicable area.

With respect to Xs=3, Xe=4, the condition (1) is not satisfied at these positions as with the above case.

With respect to Xs=4, Xe=8, the condition (3) is not satisfied because the gradation change at the start point position is decremental and the gradation change at the end point position is incremental.

With respect to Xs=8, Xe=16, the area is judged as a linear-interpolation-applicable area because all the conditions are satisfied at these positions. The other areas are successively judged, and it can be seen that with respect to Xs=20, Xe=24, the area is judged as a linear-interpolation-applicable area.

FIG. 2(c) shows the results of a linear interpolation process performed on pixel positions x=8 to x=16 and pixel positions x=20 to x=24. The processing operation is the same as the processing sequence described above with reference to FIG. 1. As shown in FIG. 2(c), the results of the linear interpolation process are the same as those shown in FIG. 1(c) for the area from x=8 to x=16 which is not susceptible to the noise produced at the positions x=3, x=19. However, the results of the linear interpolation process are different from those shown in FIG. 1(c) for the areas including x=3, x=19.

Figure 2:
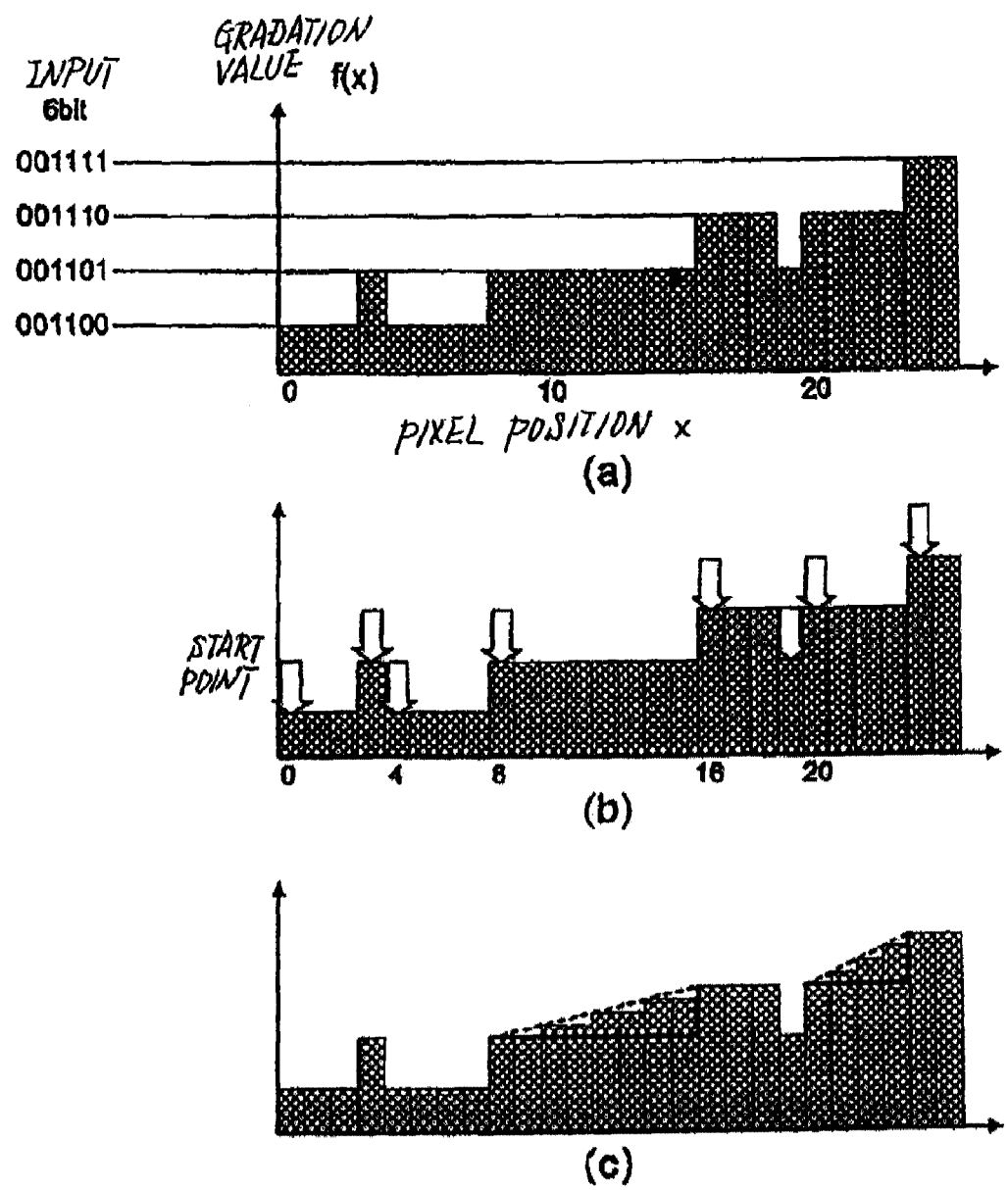
FIG. 2 is a diagram showing another example of a detecting process and a linear interpolation process according to the background art in a gradation expanding process in which a noise component is added to an image signal shown in FIG. 1.

In the example shown in FIG. 1, since the image signal contains no noise component, the gradation expanding process produces smooth gradation changes in all the areas (positions). In the example shown in FIG. 2, however, as a gradation change caused by a noise component is regarded as a detected point and detected as a start point or an end point for linear interpolation, processed results that are totally different from those shown in FIG. 1(c) are obtained. Some of the background art described above do not detect such a gradation change, but fail to produce processed results that are the same as those shown in FIG. 1(c) because the start and end points of the linear-interpolation-applicable area are reset. This suggests that the gradation expanding process according to the background art is affected even by a slight gradation change that is not essentially perceived when the image is viewed, such as a one gradation difference on one pixel.

Such a slight gradation change should desirably not cause the process of detecting a linear-interpolation-applicable area in the gradation expanding process to affect the interpolation process for the reason of a major factor for causing the gradation change.

Generally, when a natural image is displayed on a display device, the image data thereof are irreversibly compressed by a JPEG or MPEG format for a reduced file capacity. Dither noise is added to an image with limited gradations for extended gradation presentations. One thing that is common in these processed images is that the noise (error) component is contained as a high-frequency component based on the fact that the sensitivity of human eyes is higher for high-frequency components than for low-frequency components. This process make the noise (error) component relatively unnoticeable. Normally, the noise/error component is considered to be sufficiently smaller in amplitude than the main component.

For example, if the gradation value is of 6 bits (ranging from 0 to 63), the dither process alternately displays the gradation value 23 and the gradation value 24 to realize a halftone presentation of 23.5 gradations. In this case, a change from the gradation value 23 to the gradation value 24 and a change from the gradation value 24 to the gradation value 23 are not to be detected as false contours or ordinary contours. High-frequency errors caused by an irreversible compression process such as JPEG, MPEG, or the like are not to be detected as false contours or ordinary contours, either.

Consequently, a high-frequency signal component having a small amplitude, or specifically, a change of one gradation on one pixel, frequently represents a halftone signal or simply an error caused by irreversible compression and expansion. A gradation change that is produced for this reason should desirably be detected as a linear-interpolation-applicable area upon gradation expansion.

FIG. 3(a) shows an example of a 6-bit image signal to be processed. FIG. 3(b) shows a linear-interpolation-applicable area detected by the gradation expanding process in case a change of one gradation on one pixel is ignored. FIG. 3(c) shows an 8-bit image signal generated by the gradation expanding process (which generates 2 bits to be added).

The image signal shown in FIG. 3(a) is the same as the image signal shown in FIG. 2(a). FIG. 3(b) shows a linear-interpolation-applicable area detected from the image signal. In FIG. 3(b), since no change of one gradation on one pixel is detected, the detected points are indicated by x=0, 8, 16, 24 only. The detected result is the same as the detected result shown in FIG. 1(b), and the linear-interpolation-applicable area ranges from x=0 to x=24.

The process shown in FIG. 3(b) may have the above condition (1) for detecting the linear-interpolation-applicable area, changed such that "the same gradation value as for the start point position continues over a plurality of pixels, the same gradation value as for the end point position continues over a plurality of pixels, and a change of one gradation on one pixel is regarded as a succession of the same gradations."

The linear interpolation process performed based on the detected result shown in FIG. 3(b) produces the processed result shown in FIG. 3(c). The processed result shown in FIG. 3(c) is the same as the processed result shown in FIG. 1(c) at the pixel positions except for x=3, 19.

At pixel positions x=3, 19 where there are noise/error components, the result of the linear interpolation process may be used as it is. However, an average value of the result of the linear interpolation process and the input gradation value is output in this example. In this manner, the processed result which is the same as the processed result shown in FIG. 1(c) is obtained.

A change of one gradation on one pixel has been described above as a high-frequency signal component having a small amplitude, which is regarded as a succession of the same gradations. However, some images may have a change of one gradation on two pixels or one gradation on three pixels in order to provide a halftone presentation or on account of an error caused by irreversible compression and expansion. For example, an image produced simply by enlarging an original image twice or three times is an example of those images. Since a change of one gradation on one pixel of the original image becomes a change of one gradation on two pixels or one gradation on three pixels in such an image, the image does not satisfy "a change of one gradation on one pixel is regarded as a succession of the same gradations" in the above condition.

If the display device is of a high-definition type, then not only a change of one gradation on one pixel, but also a change of one gradation on two pixels or one gradation on three pixels, may easily be perceived as an error. This case does not satisfy "a change of one gradation on one pixel is regarded as a succession of the same gradations" in the above condition, either.

Figure 3:
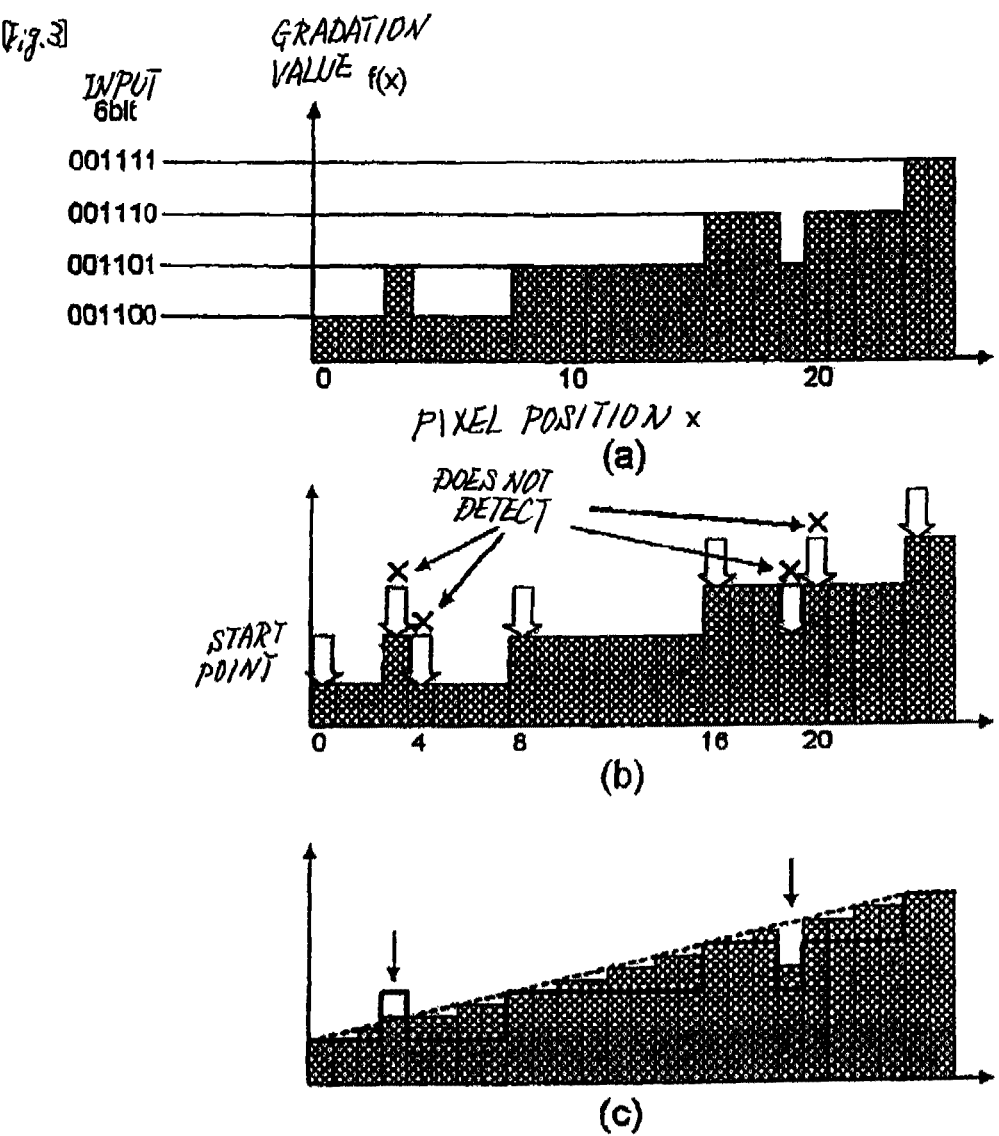
FIG. 3 is a diagram showing an example of a detecting process and a linear interpolation process according to the present invention in a gradation expanding process in which a noise component is added to the image signal shown in FIG. 1.
Figure 4:
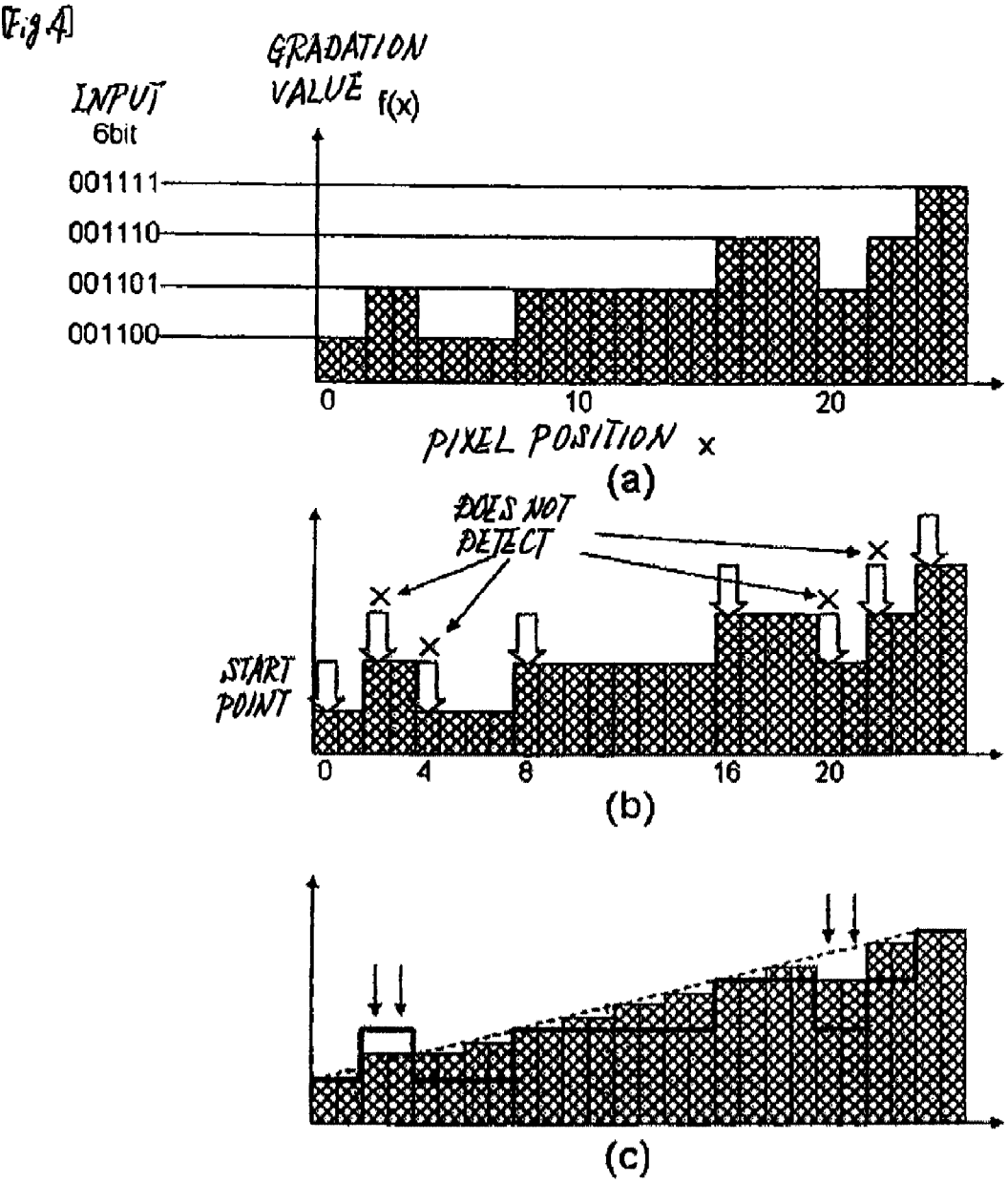
FIG. 4 is a diagram showing another example of a detecting process and a linear interpolation process according to the present invention in a gradation expanding process in which a noise component is added to the image signal shown in FIG. 1.

FIG. 4 shows an example of the linear interpolation process performed on an input image that has been enlarged twice, without detecting a change of one gradation on two pixels. FIG. 4(a) shows an example of an image signal that has been enlarged twice, in which a gradation change occurs on every two or more pixels. It is desirable that the same gradation expanding process as shown in FIG. 3 be performed on such a simply enlarged image. According to the present invention, the condition (1) for detecting the linear-interpolation-applicable area is changed such that "the same gradation value as for the start point position continues over a plurality of pixels, the same gradation value as for the end point position continues over a plurality of pixels, and a change of one gradation on one pixel group is regarded as a succession of the same gradations." The term "pixel group" refers to a cluster of pixels having the same gradation value. If an original image is simply enlarged, all the pixels of the pixel group have the same gradation value. Since the original image is enlarged twice, two pixels□two pixels make up one pixel group.

FIG. 4(b) shows a detected result when the condition (1) for detecting the linear-interpolation-applicable area is changed as described above. The detecting process is carried out on each set of two pixels as indicated by x=0, 2, 4, . . . . In this manner, a change of one gradation on one pixel group can be detected. In FIG. 4(b), since a change of one gradation on one pixel group is not detected, the detected points are x=0, 8, 16, 24 only. The linear interpolation process performed based on the detected result shown in FIG. 4(b) produces the processed result shown in FIG. 4(c). An average value of the result of the linear interpolation process and the input gradation value is output at pixel positions x=2, 3, 20, 21 where there are noise/error components. Though the detecting process is illustrated as being performed on each set of two pixels, it may be performed to detect on each pixel and a change of one gradation on n pixels may be ignored to achieve the same advantages.

In view of the above analysis, according to the present invention, the means for performing gradation expansion on a digital image signal has the following components:

(1) a detector for detecting a linear-interpolation-applicable area, and an expansion corrector for performing gradation expansion based on the detected linear-interpolation-applicable area.

(2) The detector sequentially scans a pixel sequence of the digital image signal to detect gradation changes. The detector detects a gradation change in a predetermined range. If the gradation value of a pixel following a position where a gradation change is detected is the same as the gradation value of a pixel preceding the position where the gradation change is detected, then the detector detects no gradation change, and detects gradation changes other than the above gradation changes at detected points where the linear interpolation process is to be performed and at other detected points.

(3) The expansion corrector performs the linear interpolation process at the detected points where the linear interpolation process is to be performed, thereby realizing an appropriate gradation expanding process.

When the present invention is applied to a device, a method, and a program described below, there is realized a gradation expanding process which is resistant to noise and errors and which is capable of reducing false contours.

For example, if an image processing device detects a linear-interpolation-applicable area of image data according to the above detecting process and performs a gradation expanding process based on the detected linear-interpolation-applicable area, then the image processing device is resistant to noise and errors, is capable of reducing false contours, and can display images of good quality.

A device for performing the above detecting process and the gradation expanding process may comprise a hardware circuit such as an LSI circuit made up of logic circuits and memories, or may comprise an information processing device such as a computer or the like which performs its processing operation according to a program. The detecting process may be performed by a hardware circuit (image detecting device), and the gradation expanding process may be performed by a gradation expanding program, or alternatively, the detecting process may be performed by a detecting program, and the gradation expanding process may be performed by a hardware circuit (gradation expanding device).

The present invention may be realized as an image processing method, an image processing program, an image detecting device which carries out a detecting process only, an image detecting method, and an image detecting program, If a display device performs the above process on image data, then the display device can display images of high quality.

Figure 5:
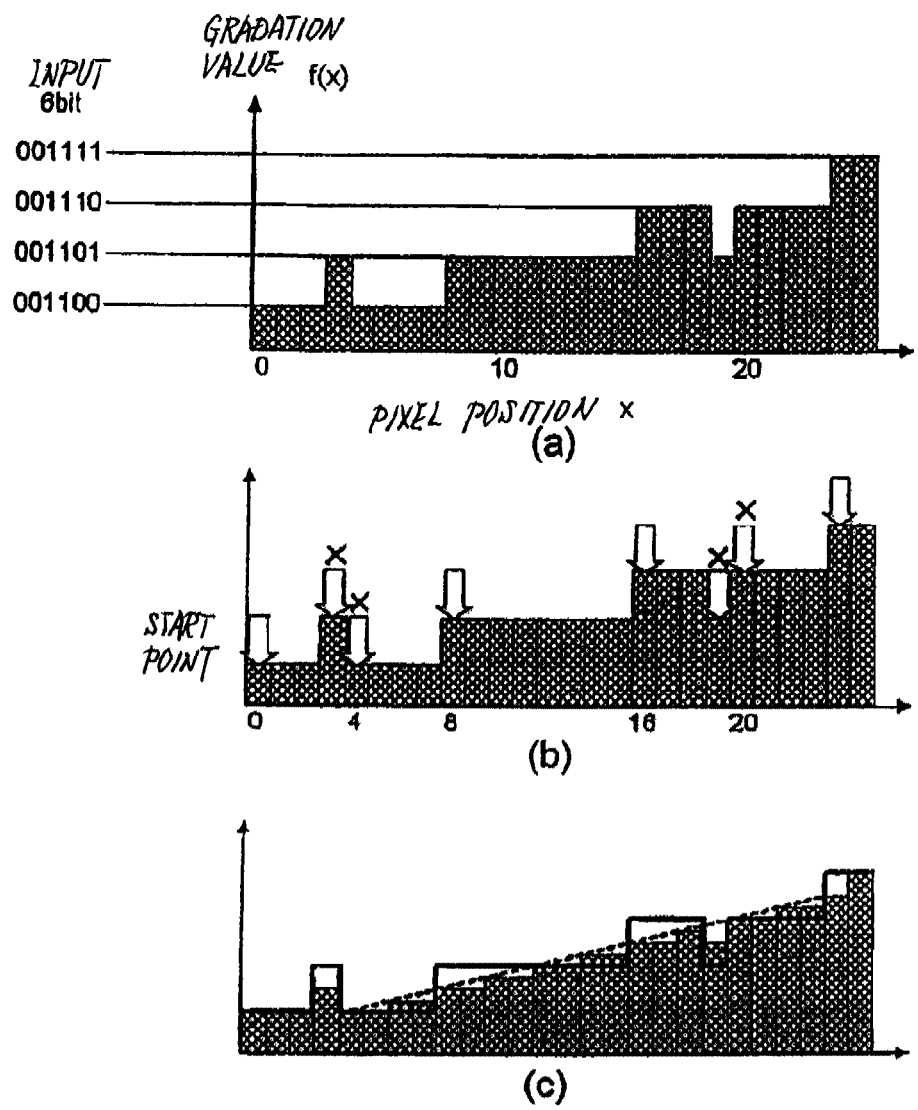
FIG. 5 is a diagram showing another example of a linear interpolation process in a gradation expanding process.

The gradation expanding process is not limited to the processes shown in FIGS. 3 and 4, but may employ other processing operations. For example, as shown in FIGS. 5(a) through (c), detected points where the gradation value difference is ½ may be interconnected (by the slanted dotted line in FIG. 5(c)), and bits to be added may be determined so as to be of values closest to the straight line. The 6-bit image data to be processed as shown in FIG. 5(a) are the same as the image data shown in FIG. 3(a), and the detected linear-interpolation-applicable area shown in FIG. 5(b) is the same as the detected linear-interpolation-applicable area shown in FIG. 3(b).

Rather than the linear interpolation process, any other optional interpolation functions may be employed. According to the present invention, a gradation change reducing process is carried out to perform the linear interpolation process for reducing the generation of false contours at a low cost regardless of the type of the interpolation process.

Exemplary embodiments of the present invention based on the principles described above will be described below.

1ST EXEMPLARY EMBODIMENT

Figure 6:
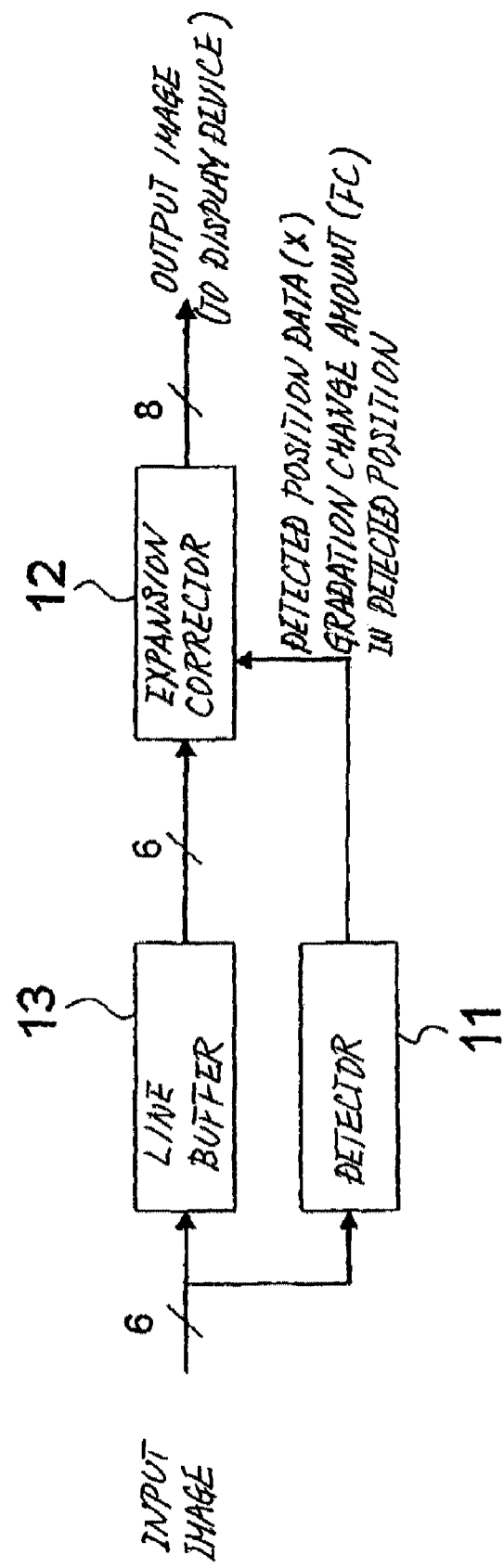
FIG. 6 is a block diagram showing an arrangement of a first exemplary embodiment of an image processing device according to the present invention.

FIG. 6 is a block diagram showing an arrangement of an image processing device according to a first exemplary embodiment of the present invention. The image processing device shown in FIG. 6 is a specific device for carrying out the processing operation of the present invention based on the principles shown in FIGS. 3 and 4.

As shown in FIG. 6, the image processing device according to the first exemplary embodiment comprises detector 11, line buffer 13, and expansion corrector 12. The image processing device according to the first exemplary embodiment is supplied with successive 6-bit image data, converts the 6-bit image data into 8-bit image data, and outputs the 8-bit image data to a display device or the like.

Detector 11 sequentially scans the input 6-bit image data per sequence, performs a gradation expanding process by way of linear interpolation per sequence, and detects a linear-interpolation-applicable area where gradations are to vary smoothly.

When detector 11 sequentially scans the input 6-bit image data per sequence, if it detects a gradation change in a predetermined range (e.g., a minimum gradation difference), and the gradation value of a pixel following a position where the gradation change is detected is the same as the gradation value of a pixel preceding the position where the gradation change is detected, then detector 11 regards the gradation change as noise or the like, and regards the gradation value of the pixel where the gradation change is detected as the gradation value of the pixels at the positions following and preceding the pixel.

While the detecting process is being carried out by detector 11, line buffer 13 accumulates the input 6-bit image data.

Expansion corrector 12 performs a gradation expanding process on the image data output from line buffer 13, using positional data X of a detected point obtained by detector 11 and gradation change FC at the detected point. As the image processing device according to the present exemplary embodiment has line buffer 13, it performs the expansion correction based on the detected result at an appropriate position in the image.

In FIG. 6, the image processing device is illustrated as having an arrangement for one of color components R, G, B. Actually, the image processing device according to the present exemplary embodiment has similar parallel arrangements for the other two colors. This holds true for the other exemplary embodiments.

Detector 11 and expansion corrector 12 of the image processing device according to the present exemplary embodiment will separately be described below.

First, specific configurational and operational details of detector 11 will be described below with reference to FIGS. 7 and 8.

Figure 7:
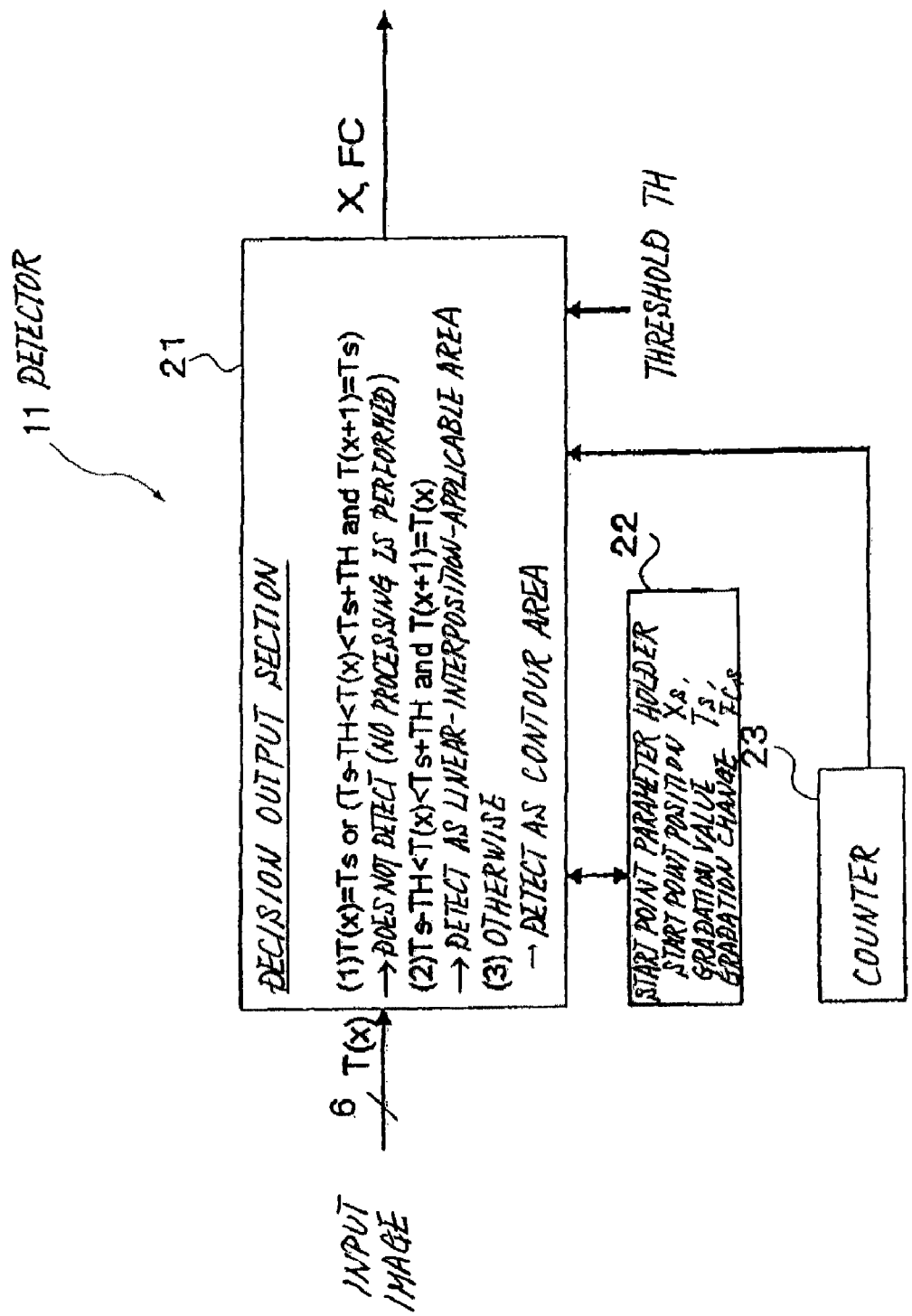
FIG. 7 is a block diagram showing an arrangement of a detector of the image processing device shown in FIG. 6.
Figure 8:
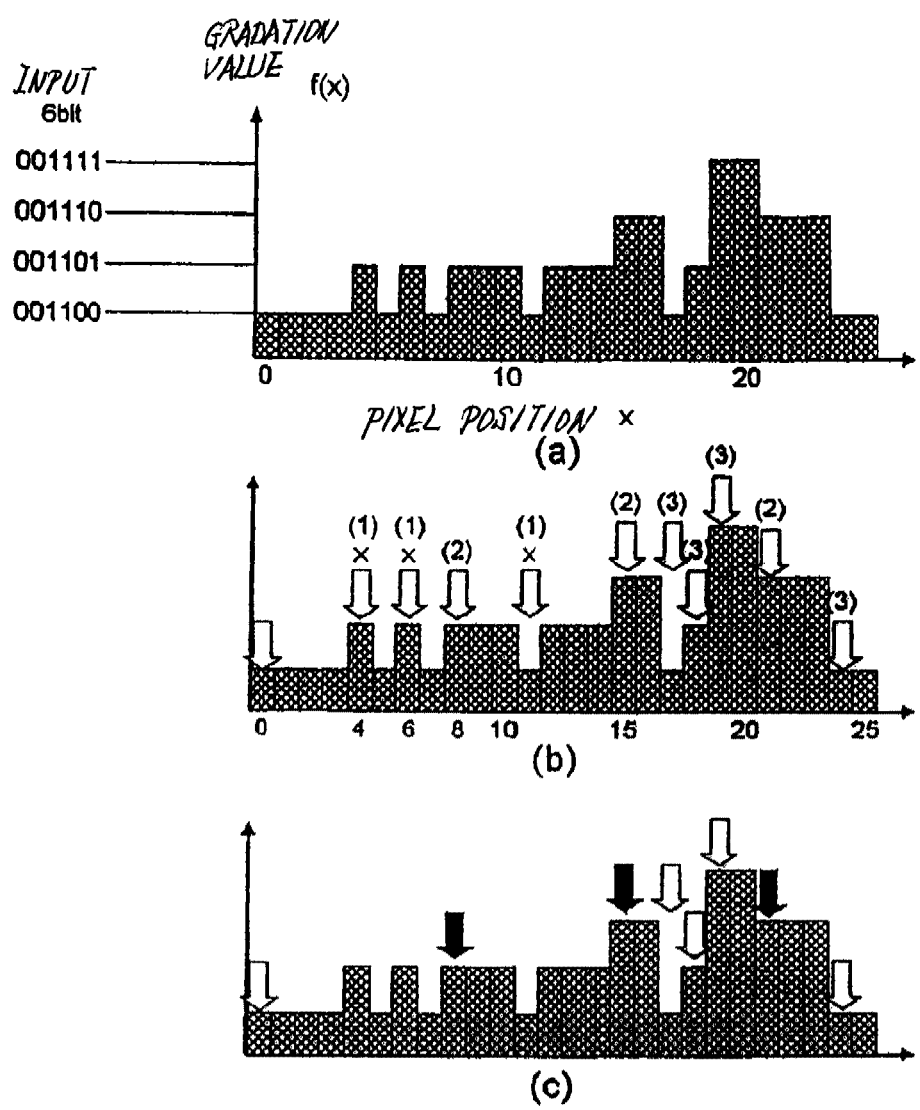
FIG. 8 is a diagram showing a processing operation of the detector of the image processing device shown in FIG. 6.

FIG. 7 is a block diagram showing an arrangement of the detector shown in FIG. 6, and FIG. 8 is a graph showing a processing operation of the detector when an arbitrary pixel sequence is input thereto.

As shown in FIG. 7, detector 11 comprises decision output section 21, start point parameter holder 22, and counter 23. Counter 23 is used to relatively recognize which position sequentially input image data is in. If the position of input data is known, then detector 11 does not need to include counter 23. Start point parameter holder 22 holds start point position Xs, start point gradation Ts, and start point gradation change FCs, which are parameters required in a decision process carried out by decision output section 21. When decision output section 21 obtains a new detected point, these parameters are changed.

Gradation change FC refers to information representing whether a detected gradation change is an incremental gradation change or a decremental gradation change, and also representing whether the gradation change is a gradation change to be processed by the linear interpolation process or a profile area not to be processed by the linear interpolation process.

Specifically, gradation change FC is one of the following values:

FC=00 . . . an incremental gradation change to be processed by the linear interpolation process;

FC=01 . . . a decremental gradation change to be processed by the linear interpolation process; and FC=10 . . . a contour area not to be processed by the linear interpolation process.

Decision output section 21 performs the following decision process based on input image data T(x) (where x represents the position of sequentially input image, and T(x) represents the gradation value at position x) and the parameters held by start point parameter holder 22 and preset threshold TH.

(1) When T(x)=Ts (the start point gradation and the gradation of the input image are the same as each other) or (Ts−TH<T(x)<Ts+TH and T(x+1)=Ts) (a gradation change of the input image falls in the range of the start point gradation±the threshold, and the gradation at position x+1 and the start point gradation are the same as each other): this corresponds to a process of removing a noise/error component according to the present invention), the detected gradation change is not regarded as a detected point (no processing is performed, and the output remains unchanged).

(2) When the condition (1) is not satisfied, Ts−TH<T(x)<Ts+TH and T(x+1)=T(x) (a gradation change of the input image falls in the range of the start point gradation±the threshold, and the gradations at position x+1 and position x are of the same value), the gradation change is regarded as a linear-interpolation-applicable area for performing the linear interpolation process. At this time, output position X=x, and output gradation change FC is FC=00 if Ts<T(x) and FC=01 if Ts>T(x). The parameters held by start point parameter holder 22 are changed from Xs to x, Ts to T(x), and FCs to FC, and will be used in next and subsequent cycles.

(3) When the condition (2) is not satisfied, the gradation change is regarded as a contour area. At this time, output position X is set to X=x and output gradation change FC is set to FC=10. As with (2), the parameters held by start point parameter holder 22 are changed from Xs to x, Ts to T(x), and FCs to FC, and will be used in next and subsequent cycles.

As described above, detector 11 sequentially scans pixel sequences of the image signal, ignores and does not detect gradation changes of one gradation on one pixel, and detects other gradation changes at detected points where the linear interpolation process is to be performed and at other detected points.

Threshold TH refers to a reference value for determining whether the gradation change at a detected point is to be smoothed by correction or to be kept as it is. Threshold TH may be set to an appropriate value depending on the details of the process and the characteristics of the input image, etc. The simplest value for threshold TH is TH=2 for smoothing the gradation change for the minimum gradation difference. If the minimum gradation difference of the input image (e.g., one screen) is 2, then the area with the minimum gradation difference is judged as an area where the gradation change is to be smoothed, and threshold TH may be set to TH=3.

The above process is confirmed with respect to an example in which a pixel sequence shown in FIG. 8(*a*) is input. It is assumed that threshold TH=2 and the image signal is input sequentially from x=0.

First, start point parameter holder 22 is set to an initial condition indicating that it does not hold any parameters. For example, when gradation value T(0)=(001100)bin at x=0 is input to start point parameter holder 22, it holds Xs=0, Ts=T(0), and FCs=10. Start point parameter holder 22 holds FCs=10 because it is unable to determine whether there is a gradation change or not at x=0 (there is no data x=−1).

When the start point parameters are set, decision output section 21 executes a process of detecting a detected point from x=1. Since T(1)=Ts at this time, decision output section 21 does not executes the detecting process, and goes to a process for a next pixel value T(2).

When x=4, T(4) becomes T(4)≠Ts, Ts−TH<T(4)<Ts+TH is satisfied, and T(5) becomes T(5)=Ts. Since condition (1) is satisfied, decision output section 21 does not execute the detecting process.

When x=8, Ts−TH<T(8)<Ts+TH is satisfied is satisfied for the first time, and T(9) becomes T(9)=T(8), so that condition (2) is satisfied. Therefore, decision output section 21 outputs X=8, FC=00, and updates the start point parameters to Xs=8, Ts=(001101) bin, and FCs=00. From x=9, decision output section 21 performs the detecting process using the updated parameters.

The above process is repeated (FIG. 8(*b*)). FIG. 8(*c*) shows the result obtained when the final detecting process is performed. In FIG. 8(*c*), the detected points are indicated by the arrows. The solid arrows indicate detected points where the linear interpolation process is to be performed, and the outline arrows other detected points. If the gradation change FC is 00 or 01, then expansion corrector 12 judges that the detected point is a detected point where the linear interpolation process is to be performed. If the gradation change FC is 10, then expansion corrector 12 judges that the detected point is a detected point where the linear interpolation process is not to be performed. It will be seen from the example shown in FIG. 8(*c*) that an area ranging from x=0 to x=15 is to be processed by the linear interpolation process. According to the background art, this area has been judged as an area where the linear interpolation process is not to be performed because of a noise/error component of one gradation on one pixel.

Specific configurational and operational details of expansion corrector 12 will be described below with reference to FIGS. 9 and 10.

Figure 9:
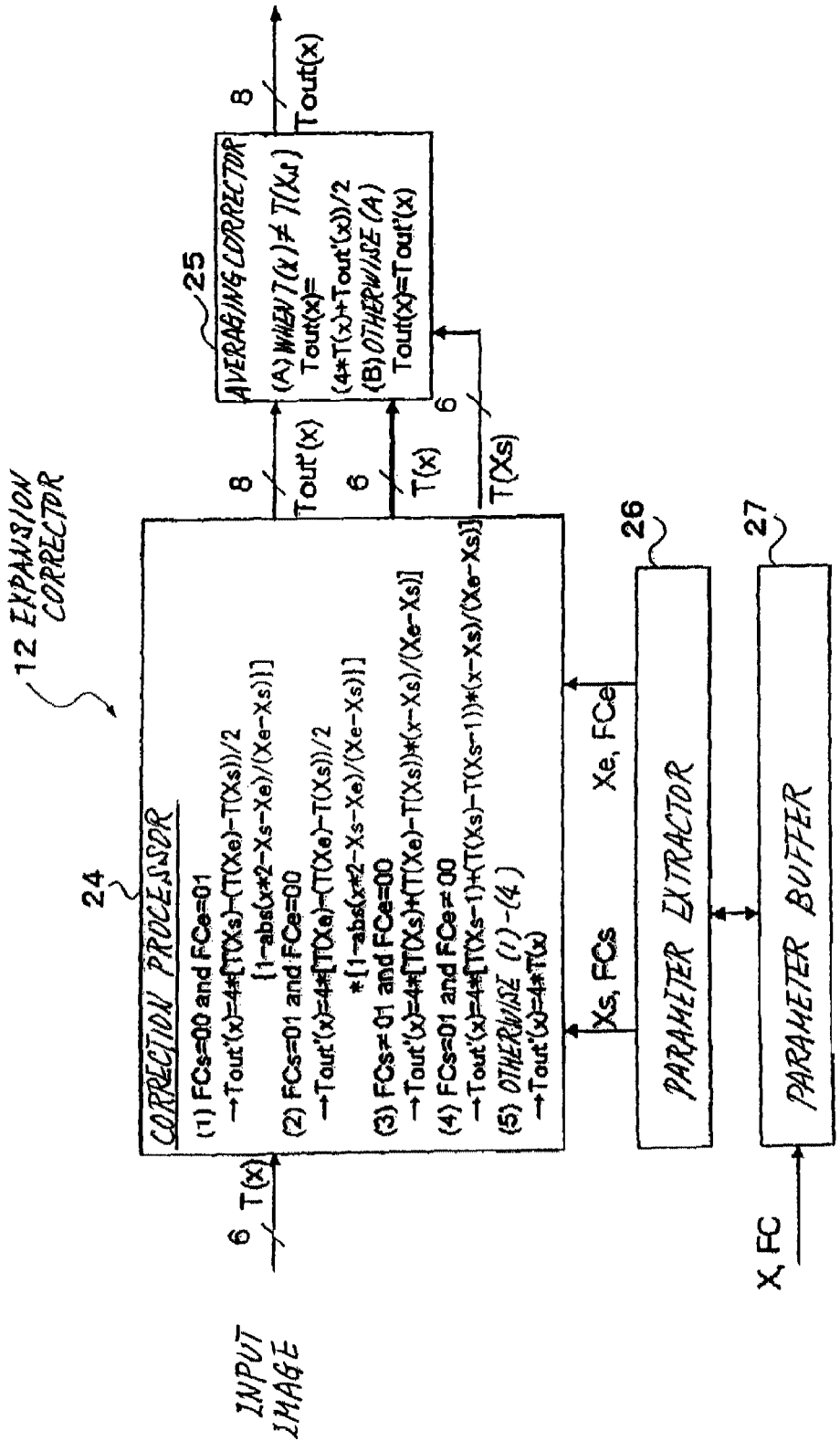
FIG. 9 is a block diagram showing an arrangement of an expansion corrector of the image processing device shown in FIG. 6.

FIG. 9 is a block diagram showing an arrangement of the expansion corrector shown in FIG. 6, and FIG. 10 is a graph showing the results of the gradation expanding process that is performed when an arbitrary pixel sequence is input to the expansion corrector.

As shown in FIG. 9, expansion corrector 12 comprises correction processor 24, averaging corrector 25, parameter extractor 26, and parameter buffer 27.

Parameter buffer 27 accumulates detected position X and gradation change FC obtained by detector 11 for each sequence (line) of the image. Parameter 26 acquires Xs, Xe related such that Xs<x<Xe, its change FCs, and FCe from parameter buffer 27, depending on pixel position x of the image that is input to correction processor 24.

Correction processor 24 is supplied with input image signal T(x) which has been given a pipeline delay by line buffer 13, performs the gradation expanding process based on the input signal and Xs, Xe, FCs, FCe acquired from parameter extractor 26, and outputs processed result Tout'(x) and input signal T(x). In the gradation expanding process, either one of the following five processes is selected and performed depending on the values of FCs, FCe.

(1) When FCs=00 and FCe=01, $$Tout'(x)=4[T(Xs)-(T(Xe)-T(Xs))/2\{1-abs(x2-Xs-Xe)/(Xe-Xs)\}].$$

(2) When condition (1) is not satisfied, and FCs=01 and FCe=00, $$Tout'(x)=4[T(Xe)-(T(Xe)-T(Xs))/2\{1-abs(x2-Xs-Xe)/(Xe-Xs)\}].$$

(3) When condition (2) is not satisfied, and FCs≠01 and FCe=00, $$Tout'(x)=4[T(Xs)+(T(Xe)-T(Xs))(x-Xs)/(Xe-Xs)].$$

(4) When condition (3) is not satisfied, and FCs=01 and FCe≠00, $$Tout'(x)=4[T(Xs-1)+(T(Xs)-T(Xs-1))(x-Xs)/(Xe-Xs)].$$

(5) When conditions (1) through (4) are not satisfied, $$Tout'(x)=4T(x).$$

Decimals are truncated. Processes (1) through (4) represent the linear interpolation process. Processes (1) and (2) represent the linear interpolation process for convex and concave sections, and processes (3) and (4) represent the linear interpolation process similar to the linear interpolation process according to the background art. Process (5) represents a process for adding a fixed gradation value, which is used on detected points where no linear interpolation process is to be performed.

In the first exemplary embodiment, the above correcting process is employed. However, only processes (3) and (4) may be employed, or other computational formulas may be employed to achieve the advantages of the present invention.

Tout'(x) produced by correction processor 24 is of 8 bits. The data of Tout'(x), T(x), and T(Xs) are sent to averaging corrector 25. When T(x)≠T(Xs) (x=4, 6, 11 in FIG. 8(*b*)) satisfy this inequality, i.e., represent pixels as noise/error components), averaging corrector 25 outputs an average value of the result of the linear interpolation and the input gradation value (Tout(x)=(4T(x)+Tout'(x))/2). Otherwise, averaging corrector 25 outputs Tout(x)=Tout'(x).

Averaging corrector 25 is supplied with digital image signal T(x) and image signal Tout'(x) output from correction processor 24, calculates an average value of corrected image signal Tout'(x) output from correction processor 24 and digital image signal T(x), outputs the average if gradation value T(x) of the input digital image signal is not the same as start point gradation T(Xs) of the linear-interpolation-applicable area, and outputs image signal Tout'(x) output from correction processor 24 otherwise.

The above process will be confirmed with respect to the pixel sequence from which the detected result shown in FIG. 8(*c*) is obtained. FIG. 10(*a*) is a repetition of FIG. 8(*c*) with the detection positions indicated by the arrows combined with the values of gradation changes FC thereabove.

As with the detecting process, the correcting process sequentially processes the input image data from x=0.

The correcting process (linear interpolation process) (3) is applied to an area ranging from x=0 to x=7 because Xs=0, FCs=10, Xe=8, FCe=00 (Xs<x<Xe). Similar, the correcting process (3) is applied to an area ranging from x=8 to x=14. The correcting process (4) is applied to an area ranging from x=21 to x=23 (FIG. 10(*b*)). The areas indicated by the dotted lines in FIG. 10(*b*) are linear interpolation processing areas.

FIG. 10(*c*) shows a result obtained by the process of averaging processor 25 after the gradation expansion is performed by correction processor 24. As shown in FIG. 10(*c*), it can be seen that the gradation differences are smoothed without being affected by changes of one gradation on one pixel in an area from x=0 to x=15 where many minimum gradation differences occur.

As described above, the image processing device according to the present exemplary embodiment includes detector 11 for detecting a linear-interpolation-applicable area and expansion corrector 12 for performing a gradation expanding process based on the detected linear-interpolation-applicable area. Detector 11 sequentially scans a pixel sequence of an input digital image signal to detect a gradation change. Detector 11 detects a gradation change in a predetermined range. If the gradation value of a pixel following a position where the gradation change is detected is the same as the gradation value of a pixel preceding the position where the gradation change is detected, then detector 11 detects no gradation change, and detects gradation changes other than the above gradation changes at detected points where the linear interpolation process is to be performed and at other detected points. Expansion corrector 12 performs the linear interpolation process on the detected points where the linear interpolation process is to be performed, thereby performing an appropriate gradation expanding process.

Averaging corrector 25 outputs an average value the result of the linear interpolation process and the input gradation value, thereby reducing a change in the signal which is presumed to be a noise/error component, and hence reducing the noise/error component.

In the present exemplary embodiment, detector 11 determines detected position data and gradation change FC of the detected position, and expansion corrector 24 performs the correcting process based on the data. However, detector 11 and expansion corrector 12 may be assigned to any desired processes. For example, detector 11 may perform processes up to the generation of a corrective bit (a value produced by subtracting an input image gradation from the processed result obtained by correction processor 12 in the present exemplary embodiment), and expansion corrector 12 may perform only a gradation adding process. Similarly, correction processor 12 and a gradation change reducer may also be assigned to any desired processes.

In the present exemplary embodiment, the detecting process is performed only in one direction (a chronological direction of the image data of an input image: X direction). However, if line buffer 13 shown in FIG. 6 is capable of storing a plurality of lines of image data, then the image processing device is able to perform not only the detecting and gradation expanding process in X direction, but also the detecting and gradation expanding process in Y direction.

However, since the detecting and gradation expanding process in Y direction depends on the number of lines that can be stored in line buffer 13, it often may not be carried out as much as the detecting and gradation expanding process in X direction. Accordingly, the gradation expanding process in Y direction may detect an area where a gradation change is to be smoothed and supply the image data of the area to an LPF (low-pass filter) to remove a noise/error component. If the detecting and gradation expanding processes in X and Y directions are thus appropriately modified depending on the limitations of the buffer, then an optimum gradation expanding process can be realized with a given configuration.

If the number of lines that can be stored in line buffer 13 is limited, then the detecting and gradation expanding process in Y direction may alternatively be performed as follows:

A false contour in an area including a gradation change such as a smooth gradation area is expressed as a curve in an XY plane. In other words, false contours detected between close lines are considered to be highly correlated to each other. Therefore, it is possible to perform the gradation expanding process from predicted detection data and detected data in Y direction. The predicted detection data may be changed as needed based on the detected data.

The detecting process in Y direction may be performed based on the image signal in the preceding frame, and the detected result may be applied to the image in the present frame. This process is based on the fact that interframe images are usually very highly correlated to each other. However, it is necessary for the image processing device to have a means for confirming the image quality and not performing the gradation expanding process by way of linear interpolation if the interframe correlation is low as upon a scene change.

As described above, even if line buffer 13 has a limited storage capacity for cost or other reasons, it is possible to perform the detecting and gradation expanding process in a direction different from the direction in which the image data stored in line buffer 13 are arranged. Accordingly, a more appropriate gradation expanding process can be realized.

2ND EXEMPLARY EMBODIMENT

An image processing device according to a second exemplary embodiment of the present invention will be described below.

Figure 11:
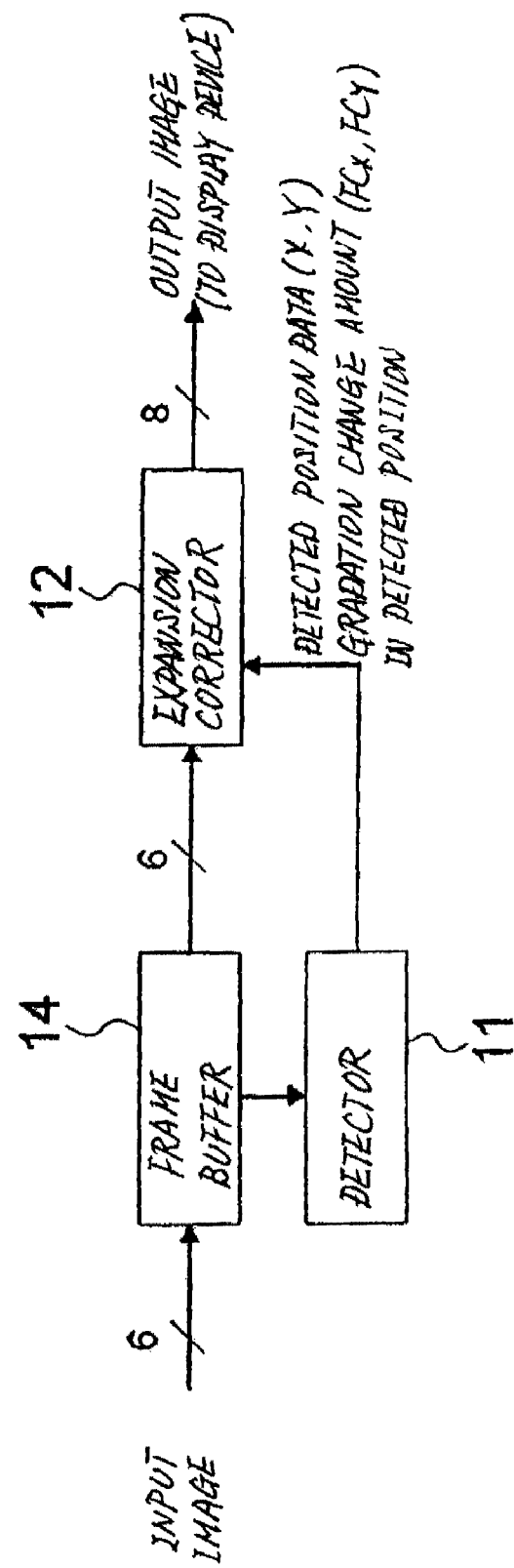
FIG. 11 is a block diagram showing an arrangement of a second exemplary embodiment of an image processing device according to the present invention.

FIG. 11 is a block diagram showing an arrangement of the image processing device according to the second exemplary embodiment of the present invention.

The image processing device according to the second exemplary embodiment differs from the image processing device according to the first exemplary embodiment shown in FIG. 6 in that it has frame buffer 14 instead of line buffer 13 and an image signal rearranged by frame buffer 14 is delivered to detector 11.

With this arrangement, the arrangement of signal sequences delivered from frame buffer 14 to detector 11 does not need to be the same as the arrangement of signal sequences of the input signal as is the case with the image processing device according to the first exemplary embodiment.

For example, if the input image is a raster image, then the image data are successively sent horizontally from the upper left corner of the screen. According to the present exemplary embodiment, successively arranged image data such as image data that are arranged vertically with respect to the arrangement of signal sequences of the raster image can be delivered in any sequence from frame buffer 14 to detector 11.

Detector 11 detects image data in a plurality of directions, e.g., a horizontal direction (X direction) and a vertical direction (Y direction), so that detected position data are produced in two-dimensional coordinates (X, Y) as shown in FIG. 11 and gradation changes are also produced in two-dimensional coordinates (FCx, FCy). Therefore, a more highly accurate gradation expanding process can be carried out. For example, expansion corrector 12 performs a gradation expansion correcting process independently on X-direction data and Y-direction data, and performs a process of adding the results or calculating an average thereof, so that the detected results in the two directions can be reflected in the gradation expanding process.

Since the image processing device according to the present exemplary embodiment has frame buffer 14, it can perform the detecting and correcting process not only in the direction in which the image data of the input image are arranged, but also in an arbitrary direction. Therefore, the image processing device can perform a more appropriate gradation expanding process.

As with the first exemplary embodiment, the image processing device according to the present exemplary embodiment can reduce noise/error components because averaging corrector 25 reduces a change in the signal which is presumed to be a noise/error component of one gradation on one pixel.

3RD EXEMPLARY EMBODIMENT

An image processing device according to a third exemplary embodiment of the present invention will be described below.

According to the first and second exemplary embodiments, the image processing method according to the present invention is applied to an image processing device. According to the third exemplary embodiment, the image processing process illustrated in the first and second exemplary embodiments is applied to a display device.

FIG. 12 is a block diagram showing an arrangement of a display device according to the present invention.

The display device according to the third exemplary embodiment comprises detector 11 for performing a detecting process on a raster image of 8-bit image data delivered from an information processing device such as a computer or the like, line buffer 13 for storing one line of image data, expansion corrector 12 for expanding the gradation of the image data output from line buffer 13 into a 10-bit gradation based on detected position data X and gradation change data FC delivered from detector 11, and image display unit 15 capable of displaying 10-bit image data.

The display device according to the third exemplary embodiment is of the same configuration as the image processing device according to the first exemplary embodiment shown in FIG. 6 except that image display unit 15 is added. In the display device according to the third exemplary embodiment, detector 11, expansion corrector 12, and line buffer 13 make up an image processor.

In the present exemplary embodiment, the gradation expansion of 8-bit image data into 10-bit image data is illustrated by way of example. However, the processing method remains the same as the gradation expansion of 6-bit image data into 8-bit image data.

The line buffer should preferably be capable of storing one line of image data in X direction of the image display unit because the display device successively processes image data per line in the main scanning direction. Image display unit 15 may be any image display unit capable of displaying image data, e.g., LCD, PDP, EL, CRT, or the like.

Therefore, even if the number of bits of input image data may thus be smaller than the number of bits that can be displayed on image display unit 15, an appropriate gradation expanding process can be performed to prevent false contours from being produced for displaying images of higher image quality.

According to the present exemplary embodiment, as with the first and second exemplary embodiments, since averaging corrector 25 reduces a change in the signal which is presumed to be a noise/error component of one gradation on one pixel, the noise/error component can be reduced.

4TH EXEMPLARY EMBODIMENT

A fourth exemplary embodiment of the present invention will be described below with reference to the drawings.

The fourth exemplary embodiment employs an information processing device to realize the image processing method according to the present invention. Specifically, as shown in FIG. 13, the processing operation of detector 11 and expansion corrector 12 shown in the first exemplary embodiment is carried out by a computer (CPU 31).

FIG. 14, FIG. 15 and FIG. 16 are a flowchart of a sequence of the image processing method according to the present invention. FIGS. 14 through 16 represents the example of the image processing device according to the first exemplary embodiment by using CPU 31.

The image processing method according to the present invention performs a detecting process on an input 6-bit raster image and expands the detected result into 8-bit data. The processing in steps S2 through S12 shown in FIG. 14 corresponds to the processing operation (first image processing operation) of detector 11 according to the first exemplary embodiment, and the processing in steps S13 through S28 shown in FIGS. 15 and 16 corresponds to the processing operation (second image processing operation) of expansion corrector 12 according to the first exemplary embodiment.

These processing sequences are executed by CPU 31 according to a program stored in a ROM or recording medium, not shown, to realize the functions of detector 11 and expansion corrector 12.

The first image processing operation will be described below with reference to FIG. 14.

As shown in FIG. 14, when image data In (6 bits) of raster image 1 are input to the computer, CPU 31 extracts information (the y value of a pixel) indicating which pixel's image signal the input image signal is (step S1). In ( ) represents a gradation value.

In order to perform a detecting and correcting process on the image data of the line based on the Y coordinate of the pixel, CPU 31 initializes input signal position x0=0 and acquires data length Xmax in predetermined X direction (step S2).

For starting the detecting process, CPU 31 sets start point position Xs=0, start point preceding position Xs0=0, start point gradation Ts=In(0, y), start point change FCs=10, and threshold TH=2 (step S3).

With the initial conditions being set, the detecting process is carried out according to the following procedure:

First, CPU 31 increments input signal position x0 by 1 (step S4).

Then, if the value of x0 is equal to Xmax, CPU 31 finishes the gradation change detecting process, and goes to step S7. Otherwise, CPU 31 goes to the gradation change detecting process (step S5).

(Gradation Change Detecting Process)

Then, when gradation data In (x0, y) of position x0 is equal to start point gradation Ts (the same gradations continue) or Ts−TH<In (x0, y)<Ts+TH and In (x0+1, y)=Ts (a change of one gradation on one pixel), CPU 31 goes back to step S4 and continues to detect a gradation change. Otherwise, CPU regards the data as a gradation change, and goes to step S7 (step S6).

Then, CPU 31 holds the values of end point position Xe=x0 and end point gradation Te=In (x0, y) (step S7).

(Detected Point Change Setting Process)

Then, when Ts−TH<In (x0, y)<Ts+TH and In (x0+1, y)=In (x0, y), CPU 31 goes to step S9 (which determines whether the area is a linear-interpolation-applicable area or not). Otherwise, CPU 31 goes to step S10 (step S8).

In step S9, CPU 31 compares In (x0, y) and Ts with each other to determine whether the gradation change is incremental or decremental in the linear-interpolation-applicable area. If the gradation change is incremental, then CPU 31 goes to step S11. If the gradation change is decremental, then CPU 31 goes to step S12.

In step S10, CPU 31 sets end point change Te to 10 (it is not an linear-interpolation-applicable area).

In step S11, CPU 31 sets end point change Te to 00 (it is an linear-interpolation-applicable area and the gradation change thereof is incremental).

In step S12, CPU 31 sets end point change Te to 01 (it is a linear-interpolation-applicable area and the gradation change thereof is decremental).

CPU 31 holds the parameters determined in steps S10 through S12, and goes to a gradation expanding process as the second image processing operation.

The second image processing operation will be described below with reference to FIGS. 15 and 16.

As shown in FIG. 15, CPU 31 sets expansion correction signal position x to Xs (step S13).

(Gradation Expansion Detail Determining Process)

Then, based on the values of start point gradation change FCs and end point gradation change FCe, CPU 31 determines a gradation expanding process to be applied (steps S14 through S17). A process of determining gradation expanding process details is performed according to (1) through (5) as follows:

(1) If FCs=00 and FCe-=01, CPU 31 executes step S18 (step S14).

(2) If condition (1) is not satisfied, and FCs=01 and FCe=00, then CPU 31 executes step S19 (step S15).

(3) If condition (2) is not satisfied and FCe=00, then CPU 31 executes step S20 (step S16).

(4) If condition (3) is not satisfied and FCs=01, then CPU 31 executes step S21 (step S17).

(5) If condition (4) is not satisfied, then CPU 31 executes step S22 (step S17)

(Gradation Expanding Process)

Using start position Xs, start point gradation Ts, end point position Xe, end point gradation Te, expansion correction signal position x, and the input image signal, CPU 31 performs one of gradation expansion processes indicated by (1) through (5) below, according to the selected results of steps S14 through S17.

(1) step S18:

$$Out'(x)=4[In(Xs)-(In(Xe)-In(Xs))/2\{1-abs(x2-Xs-Xe)/(Xe-Xs)\}].$$

(2) step S19;

$$Out'(x)=4[In(Xe)-(In(Xe)-In(Xs))/2\{1-abs(x2-Xs-Xe)/(Xe-Xs)\}].$$

(3) step S20:

$$Out'(x)=4[In(Xs)+(In(Xe)-In(Xs))(x-Xs)/(Xe-Xs)].$$

(4) step S21:

$$Out'(x)=4[In(Xs0)+(In(Xs)-In(Xs0))(x-Xs)/(Xe-Xs)].$$

(5) step S22 (no linear interpolation process is performed);

$$Out'(x)=4In(x).$$

(Averaging Correction Process)

Then, CPU 31 compares In (x,y) and Ts with each other and performed either one of the following processes (step S23):

When In(x)≠Ts, Out(x)=(In(x)+Out'(x))/2

Otherwise, Out(x)=Out'(x)

Then, CPU 31 increments the value of x by 1 (step S24).

If x<Xe, then CPU 31 returns to step S14 in order to repeat the gradation expanding process using same parameters Xs, Ts, Xe, Te. If x≧Xe, then CPU 31 puts finishes the gradation expanding process (step S25).

Then, CPU 31 compares the values of x0 and Xmax (step S26). If x0=Xmax, then CPU 31 goes to step S29 because it has performed the gradation expanding process on all input signals In (x, y) of one line from x=0 to Xmax. Otherwise, CPU 31 goes to step S27 to continue the process for the remaining input signals.

In step S27, CPU 31 puts Xs into start point preceding position Xs.

Then, CPU 31 puts Xe into start point position Xs, Te into start point gradation Ts, and puts FCe into start point change FCs (step S28), and then returns to step S4 to start the detecting process again.

CPU 31 outputs output image data Out (x, y) (8 bits) obtained by the above process (step S29).

As described above, the processing operation (first image processing operation) of detector 11 and the processing operation (second image processing operation) of expansion corrector 12 according to the first exemplary embodiment are executed by the computer to perform the same image processing operation as with the image processing device according to the first exemplary embodiment without the need for special hardware.

The flowchart shown in FIGS. 14 through 16 represents the processing operation of the image processing device according to the first exemplary embodiment. The processing operation of the image processing device according to the second exemplary embodiment may also be executed by a computer.

In the fourth exemplary embodiment, the process of reducing the amount of data of the raster image and the process of expanding the image data to restore the original image are carried out by the computer according to the program. Either one of these processes may be carried out by the computer.

In the fourth exemplary embodiment, the functions of the image processing device according to the first exemplary embodiment are realized by the computer. The processing operations of the image detecting device and gradation expanding device described above may also be realized by a computer.

In the first through fourth exemplary embodiments, the number of bits of image data that is increased by gradation expansion is illustrated as being constant. However, number of bits may be increased to any number by gradation expansion.

The first through fourth exemplary embodiments are illustrative of preferred examples of the present invention, and the present invention is not limited to the configurations shown in the first through fourth exemplary embodiments. For example, the numbers of bits of image data in the respective colors do no need to be increased to the same number by the gradation expanding process. Specifically, if the image data are represented by three colors R, G, B, with data R being of 5 bits, data G being of 6 bits, and data B being of 5 bits, then data R and data B may be expanded by 3 bits and data G by 2 bits to convert image data R, G, B into 8-bit image data.

The numbers of bits of only some of the colors of image data R, G, B may be increased. The raster image is not required to be a color image made up of image data in a plurality of colors, but may be a monochromatic image.

In the exemplary embodiments, a change of one gradation on one pixel is presumed to be a noise/error component. However, as indicated by the principles of the present invention, a change of one gradation on n pixels may be detected as a noise/error component depending on the degree of the definition of the image and the display device. The present invention can thus be modified in various ways.

The invention claimed is:

1. An image processing device comprising:
    a detector detecting a linear-interpolation-applicable area, as an area where a gradation change is to be smoothed by performing a gradation expanding process by way of linear interpolation on a pixel sequence of an input digital image signal, by sequentially scanning the pixel sequence of said input digital image signal; and
    an expansion corrector performing a gradation expanding process on the linear-interpolation-applicable area detected by said detector;
    wherein when said detector sequentially scans gradation values of the pixel sequence of said input digital image signal, if the detector detects a gradation change in a predetermined range and the gradation value of a pixel at a position following a position where the gradation change is detected is the same as the gradation value of a pixel at a position preceding the position where the gradation change is detected, then said detector regards the gradation value of the pixel where the gradation change is detected as the gradation value of the pixels at the positions following and preceding the pixel.

2. An image processing device comprising:
a detector detecting a linear-interpolation-applicable area, as an area where a gradation change is to be smoothed by performing a gradation expanding process by way of linear interpolation on a pixel sequence of an input digital image signal, by sequentially scanning the pixel sequence of said input digital image signal; and
an expansion corrector performing a gradation expanding process on the linear-interpolation-applicable area detected by said detector;
wherein when said detector sequentially scans gradation values of the pixel sequence of said input digital image signal, if the detector detects a gradation change in a predetermined range with the same gradation values continuing over a plurality of pixels from a position where the gradation change is detected, and the gradation value of a pixel at a position following the same gradation values is the same as the gradation value of a pixel at a position preceding the position where the gradation change is detected, then said detector regards the gradation value of the pixel where the gradation change is detected as the gradation value of the pixels at the positions following and preceding the pixel.

3. An image processing device according to claim 1, further comprising:
a correction processor performing a correcting process on said input digital image signal based on detected position data and a gradation change from said detector; and
an averaging corrector being supplied with said digital output signal and an output image signal from said correction processor, calculating an average value of the image signal corrected by said correction processor and said digital image signal, outputting said average value if the gradation value of said digital image signal is not the same as a start point gradation of the linear-interpolation-applicable area, and outputting the output image signal from said correction processor otherwise.

4. An image processing device according to claim 1, further comprising:
a line buffer storing at least one line of image signal of said digital image signal.

5. An image processing device according to claim 1, further comprising:
a frame buffer storing at least an image signal representing one screen of said digital image signal.

6. An image processing device according to claim 1, wherein said gradation change in the predetermined range comprises a gradation change of a minimum gradation difference of said digital image signal.

7. An image processing device according to claim 1, wherein said detector detects, as said linear-interpolation-applicable area, adjacent areas in which the same gradation values continue and which satisfy a condition that the gradation difference between the areas fall within a predetermined value.

8. A display device comprising:
an image processor including a detector detecting a linear-interpolation-applicable area, as an area where a gradation change is to be smoothed by performing a gradation expanding process by way of linear interpolation on a pixel sequence of an input digital image signal, by sequentially scanning the pixel sequence of said input digital image signal, wherein if the detector detects a gradation change in a predetermined range and the gradation value of a pixel at a position following a position where the gradation change is detected is the same as the gradation value of a pixel at a position preceding the position where the gradation change is detected, then said detector regards the gradation value of the pixel where the gradation change is detected as the gradation value of the pixels at the positions following and preceding the pixel, and an expansion corrector performing a gradation expanding process on the linear-interpolation-applicable area detected by said detector; and
a display unit displaying an image based on an output signal from said image processor.

9. A display device comprising:
an image processor including a detector detecting a linear-interpolation-applicable area, as an area where a gradation change is to be smoothed by performing a gradation expanding process by way of linear interpolation on a pixel sequence of an input digital image signal, by sequentially scanning the pixel sequence of said input digital image signal, wherein the detector detects a gradation change in a predetermined range with the same gradation values continuing over a plurality of pixels from a position where the gradation change is detected, and the gradation value of a pixel at a position following the same gradation values is the same as the gradation value of a pixel at a position preceding the position where the gradation change is detected, then said detector regards the gradation value of the pixel where the gradation change is detected as the gradation value of the pixels at the positions following and preceding the pixel, and an expansion corrector performing a gradation expanding process on the linear-interpolation-applicable area detected by said detector; and
a display unit displaying an image based on an output signal from said image processor.

10. An image processing method comprising the steps of:
detecting a linear-interpolation-applicable area, as an area where a gradation change is to be smoothed by performing a gradation expanding process by way of linear interpolation on a pixel sequence of an input digital image signal, by sequentially scanning the pixel sequence of said input digital image signal; and
performing a gradation expanding process on the linear-interpolation-applicable area detected by said detector;
wherein said step of detecting a linear-interpolation-applicable area sequentially scans gradation values of the pixel sequence of said input digital image signal, if said step of detecting a linear-interpolation-applicable area detects a gradation change in a predetermined range and the gradation value of a pixel at a position following a position where the gradation change is detected is the same as the gradation value of a pixel at a position preceding the position where the gradation change is detected, then said step of detecting a linear-interpolation-applicable area regards the gradation value of the pixel where the gradation change is detected as the gradation value of the pixels at the positions following and preceding the pixel.

11. An image processing method comprising the steps of:
detecting a linear-interpolation-applicable area, as an area where a gradation change is to be smoothed by performing a gradation expanding process by way of linear interpolation on a pixel sequence of an input digital image signal, by sequentially scanning the pixel sequence of said input digital image signal; and performing a gradation expanding process on the linear-interpolation-applicable area detected by said detector;

wherein said step of detecting a linear-interpolation-applicable area sequentially scans gradation values of the pixel sequence of said input digital image signal, if said step of detecting a linear-interpolation-applicable area detects a gradation change in a predetermined range detects a gradation change in a predetermined range with the same gradation values continuing over a plurality of pixels from a position where the gradation change is detected, and the gradation value of a pixel at a position following the same gradation values is the same as the gradation value of a pixel at a position preceding the position where the gradation change is detected, then said step of detecting a linear-interpolation-applicable area regards the gradation value of the pixel where the gradation change is detected as the gradation value of the pixels at the positions following and preceding the pixel.

12. A non-transitory computer readable medium containing a program for enabling a computer to carry out an image processing method comprising the steps of:

detecting a linear-interpolation-applicable area, as an area where a gradation change is to be smoothed by performing a gradation expanding process by way of linear interpolation on a pixel sequence of an input digital image signal, by sequentially scanning the pixel sequence of said input digital image signal; and performing a gradation expanding process on the linear-interpolation-applicable area detected by said detector;

wherein said step of detecting a linear-interpolation-applicable area sequentially scans gradation values of the pixel sequence of said input digital image signal, if said step of detecting a linear-interpolation-applicable area detects a gradation change in a predetermined range and the gradation value of a pixel at a position following a position where the gradation change is detected is the same as the gradation value of a pixel at a position preceding the position where the gradation change is detected, then said step of detecting a linear-interpolation-applicable area regards the gradation value of the pixel where the gradation change is detected as the gradation value of the pixels at the positions following and preceding the pixel.

13. An image processing device according to claim 2, further comprising:

a correction processor performing a correcting process on said input digital image signal based on detected position data and a gradation change from said detector; and an averaging corrector being supplied with said digital output signal and an output image signal from said correction processor, calculating an average value of the image signal corrected by said correction processor and said digital image signal, outputting said average value if the gradation value of said digital image signal is not the same as a start point gradation of the linear-interpolation-applicable area, and outputting the output image signal from said correction processor otherwise.

14. An image processing device according to claim 2, further comprising:

a line buffer storing at least one line of image signal of said digital image signal.

15. An image processing device according to claim 2, further comprising:

a frame buffer storing at least an image signal representing one screen of said digital image signal.

16. An image processing device according to claim 2, wherein said gradation change in the predetermined range comprises a gradation change of a minimum gradation difference of said digital image signal.

17. An image processing device according to claim 2, wherein said detector detects, as said linear-interpolation-applicable area, adjacent areas in which the same gradation values continue and which satisfy a condition that the gradation difference between the areas fall within a predetermined value.

18. A non-transitory computer readable medium containing a program for enabling a computer to carry out an image processing method comprising the steps of:

detecting a linear-interpolation-applicable area, as an area where a gradation change is to be smoothed by performing a gradation expanding process by way of linear interpolation on a pixel sequence of an input digital image signal, by sequentially scanning the pixel sequence of said input digital image signal; and performing a gradation expanding process on the linear-interpolation-applicable area detected by said detector;

wherein said step of detecting a linear-interpolation-applicable area sequentially scans gradation values of the pixel sequence of said input digital image signal, if said step of detecting a linear-interpolation-applicable area detects a gradation change in a predetermined range detects a gradation change in a predetermined range with the same gradation values continuing over a plurality of pixels from a position where the gradation change is detected, and the gradation value of a pixel at a position following the same gradation values is the same as the gradation value of a pixel at a position preceding the position where the gradation change is detected, then said step of detecting a linear-interpolation-applicable area regards the gradation value of the pixel where the gradation change is detected as the gradation value of the pixels at the positions following and preceding the pixel.

* * * * *